(12) United States Patent
Toya et al.

(10) Patent No.: US 8,305,422 B2
(45) Date of Patent: Nov. 6, 2012

(54) COMMUNICATION DEVICE, COMMUNICATION METHOD, COMMUNICATION SYSTEM, PROGRAM, AND COMPUTER-READABLE STORAGE MEDIUM

(75) Inventors: Tomoyuki Toya, Yachiyo (JP); Makoto Shinkai, Chiba (JP); Katsuo Doi, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 1219 days.

(21) Appl. No.: 12/092,809

(22) PCT Filed: Nov. 7, 2006

(86) PCT No.: PCT/JP2006/322187
§ 371 (c)(1),
(2), (4) Date: May 6, 2008

(87) PCT Pub. No.: WO2007/055206
PCT Pub. Date: May 18, 2007

(65) Prior Publication Data
US 2009/0051755 A1    Feb. 26, 2009

(30) Foreign Application Priority Data
Nov. 8, 2005 (JP) .................................. 2005-324139

(51) Int. Cl.
*H04N 7/14* (2006.01)
(52) U.S. Cl. ................... 348/14.08; 348/14.02
(58) Field of Classification Search ............... 348/14.01, 348/14.02, 14.08; 379/93.21
See application file for complete search history.

(56) References Cited

U.S. PATENT DOCUMENTS

| | | | | |
|---|---|---|---|---|
| 6,025,871 | A * | 2/2000 | Kantor et al. | 348/14.07 |
| 6,122,259 | A | 9/2000 | Ishida | |
| 6,144,403 | A | 11/2000 | Otani | |
| 6,359,837 | B1 | 3/2002 | Tsukamoto | |
| 7,206,806 | B2 * | 4/2007 | Pineau | 348/14.02 |
| 2002/0137529 | A1 | 9/2002 | Takahashi | |
| 2004/0233180 | A1 | 11/2004 | Hiroi et al. | |
| 2004/0246951 | A1 * | 12/2004 | Parker et al. | 348/14.08 |
| 2004/0253991 | A1 * | 12/2004 | Azuma | 455/566 |
| 2006/0023063 | A1 * | 2/2006 | Okawa | 348/14.09 |
| 2007/0040892 | A1 * | 2/2007 | Aoki et al. | 348/14.01 |

FOREIGN PATENT DOCUMENTS

| | | |
|---|---|---|
| JP | 9-46591 A | 2/1997 |
| JP | 9-294166 A | 11/1997 |
| JP | 9-294255 A | 11/1997 |
| JP | 2000-259567 A | 9/2000 |

(Continued)

*Primary Examiner* — Stella Woo
(74) *Attorney, Agent, or Firm* — Birch, Stewart, Kolasch & Birch, LLP

(57) ABSTRACT

A communication device of the present invention which is realized as a video communication device (1) includes: a communication control section (2) for establishing communication connection with other communication device; a content receiving section (6) for obtaining content data from the outside; and a content transmission section (8) for specifying another communication device as a communication device, to which the obtained content data should be transmitted, if connection with said another communication device is established when the content receiving section (6) obtains the content data, so that it is possible to easily share the content data, obtained from the outside, with the communication counterpart device with which the communication connection has been established. This makes it possible to realize a communication device which can easily transmit the content data, obtained from the outside, to the communication counterpart device, that is, this makes it possible to realize a communication device which can easily share the content data, obtained from the outside.

19 Claims, 20 Drawing Sheets

FOREIGN PATENT DOCUMENTS

| | | |
|---|---|---|
| JP | 2001-274936 A | 10/2001 |
| JP | 2002-51312 A | 2/2002 |
| JP | 2002-142140 A | 5/2002 |
| JP | 2002-354149 A | 12/2002 |
| JP | 2003-219059 A | 7/2003 |
| JP | 2003-259323 A | 9/2003 |
| JP | 2004-348189 A | 12/2004 |
| JP | 2005-210236 A | 8/2005 |
| JP | 2005-229522 A | 8/2005 |
| JP | 2005-260626 A | 9/2005 |
| JP | 2006-129058 A | 5/2006 |

* cited by examiner

```
<contentlist>
<title>PHOTOGRAPH LIST</title>
<content>undoukai.jpg</content>
<content>flower.jpg</content>
<content>baby.jpg</content>
</contentlist>
```

FIG. 8

SET FORMAT

DEVICE: PROTOCOL : PORT : DATA TYPE

EXAMPLE 1: INFRARED COMMUNICATION

Ir:IrSimple::jpg

Ir:IrSimple::png

EXAMPLE OF SET DATA WHICH SHARE jpg OR png DATA FILE BY USING COMMUNICATION METHOD IN IrSimple Ir (INFRARED COMMUNICATION) DEVICE

EXAMPLE 2: IP NETWORK COMMUNICATION

Ether:HTTP:8080:jpg

EXAMPLE OF SETTING SHARING WHEN RECEIVING jpg FILE IN HTTP PROTOCOL AT PORT 8080 USING EtherNetwork DEVICE

EXAMPLE 3: SD CARD

SD:::/share/*.jpg

EXAMPLE OF SETTING SHARING jpg FILE IN SD CARD INSERTED TO SD CARD SLOT (IF THERE IS ONE)

EXAMPLE 4: Bluetooth COMMUNICATION

BT:::jpg

EXAMPLE OF SETTING OBTAINING OF jpg FILE BY Bluetooth AT INITIATION OF SHARING

EXAMPLE 5: IP NETWORK COMMUNICATION (STREAMING)

Ether:RTP/AVP:4000: MP4V-ES/90000

EXAMPLE OF SETTING INITIATION OF SHARING WHEN MPEG4 STREAMING IS RECEIVED AT PORT 4000 USING EtherNetwork DEVICE

FIG. 10

```
INVITE sip:vc2@vc.sharp.co.jp SIP/2.0
Via: SIP/2.0/UDP 172.16.0.163:5060;branch=z9hG4bK1066896417
From: "Mari" <sip:vc1@vc.sharp.co.jp>;tag=897334059-1-0
To: <sip:vc2@vc.sharp.co.jp>;
Call-ID: 1365018947@172.16.0.163
CSeq: 2 INVITE
Contact: <sip:vc1@172.16.0.163:5060>
supported: timer
Session-Expires: 180;refresher=uac
max-forwards: 70
Content-Type: application/sdp
Content-Length: ...

v=0
o=- 0 0 IN IP4 172.16.0.163
s=-
c=IN IP4 172.16.0.163
t=0 0
m=audio 4050 RTP/AVP 0
a=rtpmap:0 PCMU/8000           }—101
m=video 4060 RTP/AVP 98
a=rtpmap:98 MP4V-ES/90000      }—102         }—100
m=application 4070 tcp http
a=X-application: sharpStillImageShare(60)  }—103
```

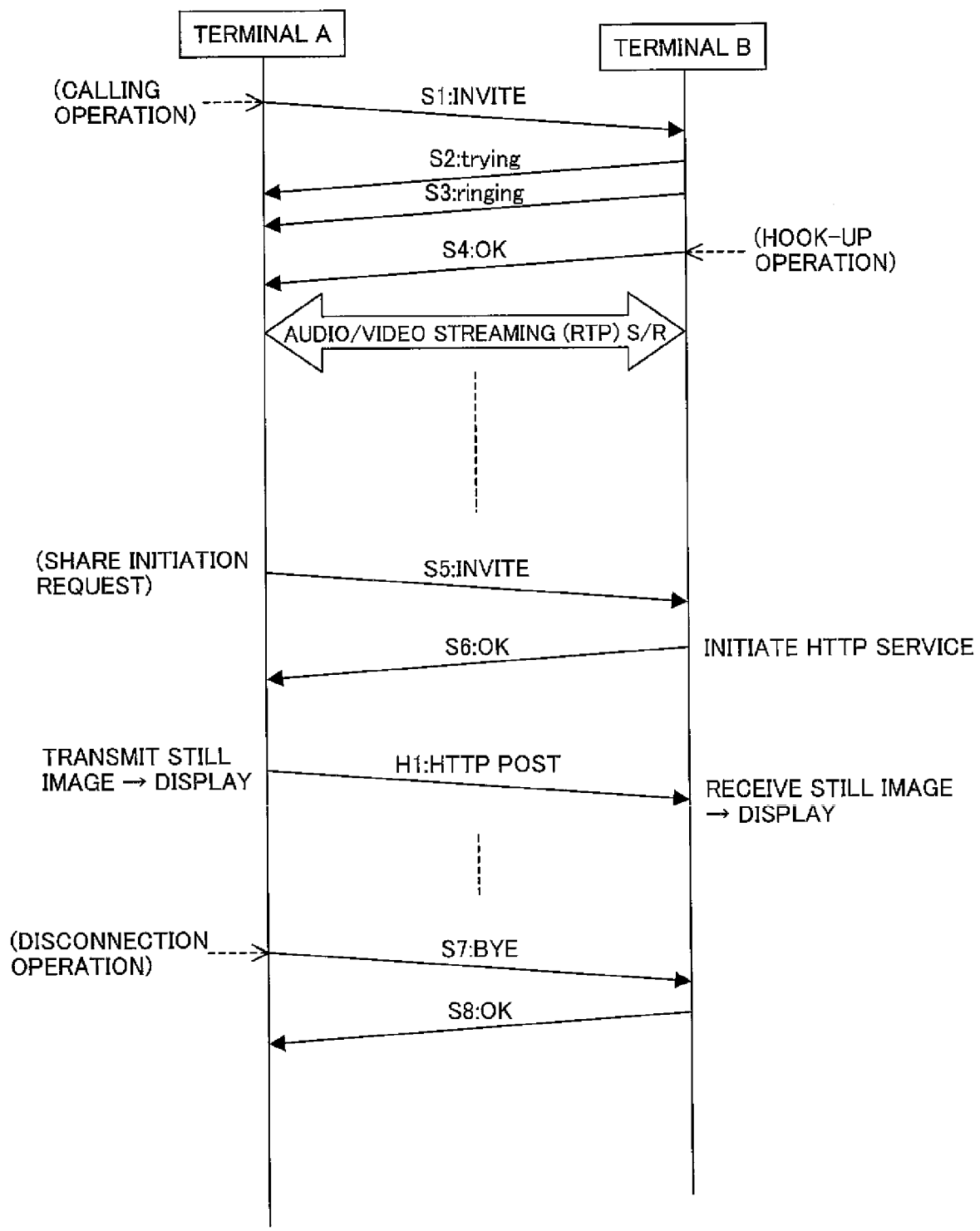

FIG. 13

```
INVITE sip:vc2@vc.sharp.co.jp SIP/2.0
Via: SIP/2.0/UDP 172.16.0.163:5060;branch=z9hG4bK1066896417
From: "Mari" <sip:vc1@vc.sharp.co.jp>;tag=897334059-1-0
To: <sip:vc2@vc.sharp.co.jp>;
Call-ID: 1365018947@172.16.0.163
CSeq: 2 INVITE
Contact: <sip:vc1@172.16.0.163:5060>
supported: timer
Session-Expires: 180;refresher=uac
max-forwards: 70
Content-Type: application/sdp
Content-Length: ...

v=0
o=- 0 0 IN IP4 172.16.0.163
s=-
c=IN IP4 172.16.0.163
t=0 0
m=audio 4050 RTP/AVP 0
a=rtpmap:0 PCMU/8000
m=video 4060 RTP/AVP 98
a=rtpmap:98 MP4V-ES/90000
m=application 4070 RTP/AVP 99
a=rtpmap:99 MP4V-ES/90000
a=X-application: sharpVideoStreamShare   }—103
```

FIG. 17

```
INVITE sip:vc2@vc.sharp.co.jp SIP/2.0
Via: SIP/2.0/UDP 172.16.0.163:5060;branch=z9hG4bK1066896417
From: "Mari" <sip:vc1@vc.sharp.co.jp>;tag=897334059-1-0
To: <sip:vc2@vc.sharp.co.jp>;
Call-ID: 1365018947@172.16.0.163
CSeq: 2 INVITE
Contact: <sip:vc1@172.16.0.163:5060>
supported: timer
Session-Expires: 180;refresher=uac
max-forwards: 70
Content-Type: application/sdp
Content-Length: ...

v=0
o=- 0 0 IN IP4 172.16.0.163
s=-
c=IN IP4 172.16.0.163
t=0 0
m=audio 4050 RTP/AVP 0
a=rtpmap:0 PCMU/8000
m=video 4060 RTP/AVP 98
a=rtpmap:98 MP4V-ES/90000
m=application 4070 tcp http
a=X-application: sharpStillImageShare(image.jpg)    }—103
```

FIG. 19 vc1@vc.sharp.co.jp vc2@vc.sharp.co.jp vc3@vc.sharp.co.jp

RETAIN PERMISSION LIST, CHECK LIST WHEN
REQUESTING SHARE INITIATION FOR COUNTERPART
NOT ON LIST, NOT TRANSMITTED TO COUNTERPART
NOT ON LIST

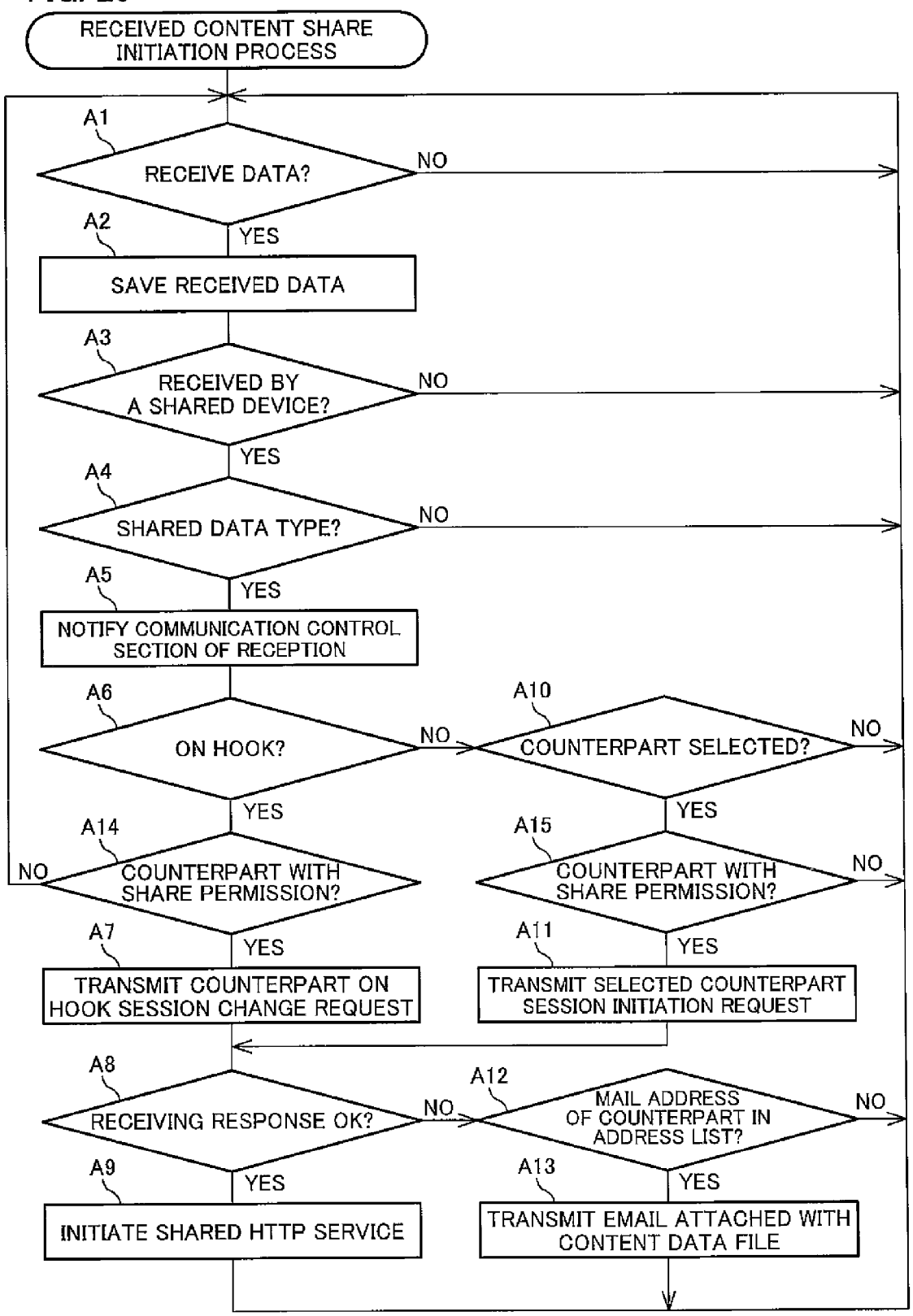

COMMUNICATION DEVICE, COMMUNICATION METHOD, COMMUNICATION SYSTEM, PROGRAM, AND COMPUTER-READABLE STORAGE MEDIUM

TECHNICAL FIELD

The present invention relates to a communication device, a communication method and a communication system which can easily share content data obtained from the outside. The present invention particularly relates to a communication device, a communication method and a communication system which can share content with a communication counterpart device while carrying out a communication for realizing a call in a television conference and the like.

BACKGROUND ART

In recent years, the Internet has rapidly spread throughout the world, and communication systems using the Internet have been gaining attention. Various communication systems have been proposed, such as instant message systems which exchange messages by transmitting/receiving text, internet telephones which exchanges audio data by VoIP (Voice Over IP), and furthermore, television conference systems and Internet television telephones which exchange video data as well as the audio data. The communication systems which use these VoIP technologies such as the television telephone, use protocols such as ITU-T recommended H. 323, IETF standard technology SIP (Session Initiation Protocol), RTP (Real-Time Transport Protocol), or the like.

These communication systems which use the Internet technologies are different to the conventional communication means such as a telephone; it is easy to implement complex functions combining other internet technologies into one. The following is one example which may be considered: A content data set is shared between communication devices which function as communication system terminals. Users participating in a call or a conference may view and listen to the shared content items at the same time.

When the content data is shared in the communication system, a user which proposes to share data (hereafter referred as a master user) specifies a content item the user intends to share, and notifies a user which receives the data (hereafter referred as a slave user) of the content data or information in order to obtain the content data. This starts the sharing of the content item.

The shared content items include content items available for anyone to obtain from the Internet, such as web contents. The shared content items may also be personally owned contents obtained from a digital camera, a digital video camera, a portable phone, or other devices.

If the content items on the Internet are shared, the content items may be shared as follows: a URL of the content data is shared between the communication device of the master user and the communication device of the slave user, and both devices download the data in accordance with the URL.

A sharing method described in Patent Document 1 is known as a method to realize the share of content, for example. In the method described in Patent Document 1, a master portable phone obtains content data from a web server, and transmits a URL of the content data to a slave portable phone at the same time, via a control device in the network. The slave portable phone then obtains the content data in accordance with the received URL. This enables both the master and slave portable phones to obtain and display the content data.

A sharing system described in Patent Document 2 is known as a sharing system to share personally owned content items, for example. In the content sharing system described in Patent Document 2, a master terminal reproduces the content data recorded on a storage medium such as a DVD. The content data is reproduced by reproduction means of a disk drive and the like provided in the master terminal. At the same time, the master terminal distributes the content data to the slave terminal. This realizes the share of the content items between the master terminal and the slave terminal.

[Patent Document 1]
 Japanese Unexamined Patent Publication, Tokukai, No. 2005-210236 (published Aug. 4, 2005)
[Patent Document 2]
 Japanese Unexamined Patent Publication, Tokukai, No. 2005-229522 (published Aug. 25, 2005)

DISCLOSURE OF INVENTION

In communications using a communication system, content data which the user intends to share during the call is not necessarily stored in a communication device which serves as a terminal of the communication system. Examples of such situation include a case where, during the call using a television conference system, the user intends to share, with his or her counterpart of the television conference, content data which exists outside the communication device serving as a terminal device of the television conference system, that is, a case where the user intends to share, with the counterpart, still image data stored in his or her mobile phone, moving image data stored in a laptop personal computer on the desk, or audio data stored in an SD memory card, and a similar case.

In case of sharing content data existing outside the communication device with the counterpart device, a conventional device raises such problem that the user has to carry out large number of operations by stages to specify content to be shared and to specify a communication device with which the content data is to be shared.

The foregoing problem is more specifically described as follows.

In the sharing method described in Patent Document 1, content data held in an open web server is shared. Thus, in case of sharing content data held in an external device on the basis of the sharing method, the user has to at least move the content data from the external device onto the web server. Also, this case raises such problem that it is easy for a third party to willfully view the content data which is to be shared.

Further, in the sharing system described in Patent Document 2, a master terminal reads out content data stored in a storage medium such as a DVD and transmits the content data to a slave terminal. Thus, in case of sharing content data held in an external device such as a mobile phone by using the sharing system, the user first copies content data of the external device onto a storage medium, subsequently moves the storage medium to a reproduction device such as a disk drive or the like, and then specifies, in the master terminal device, the content data to be specified out of data sets stored in the storage medium. In this manner, the user has to carry out a large number of operations by stages.

Further, even if there is added such an arrangement that specified content data is obtained from a specified external device into a communication device such as an IP phone, the user has to carry out at least (i) an operation for specifying the external device and (ii) an operation for specifying content data to be shared out of plural data sets stored in the external device. Besides, the user also has to carry out an operation for specifying a communication device with which the content data is to be shared. Furthermore, in a call mode referred to as "party line" such as a television conference, it is also necessary to specify a party with whom the content data is to be shared out of plural parties during conversation. In this manner, operations carried out with respect to the IP phone to initiate share of the content data are complicate. This results in such problem that it is difficult to smoothly initiate share of content data during the call.

The present invention was made in view of the foregoing problems, and an object of the present invention is to realize a communication device which can easily transmit content data obtained from the outside to its counterpart device, that is, a communication device which can easily share content data obtained from the outside.

In order to solve the foregoing problems, a communication device of the present invention comprises: communication connection establishing means for establishing communication connection with other communication device; content data obtaining means for obtaining content data from the outside; and content data transmission means for specifying another communication device as a communication device, to which the obtained content data should be transmitted, if connection with said another communication device is established when the content data obtaining means obtains the content data.

According to the arrangement, another communication device (communication counterpart device) is specified as a communication device, to which the obtained content data should be transmitted, if connection with the counterpart device is established when the content data obtaining means obtains the content data. That is, according to the arrangement, the transmission means can specify a communication counterpart device, with which the communication connection establishing means establishes communication connection, as a device, to which the obtained content data should be transmitted, without necessity for the user to carry out any operation.

Thus, according to the arrangement, if there is a communication counterpart device with which the connection establishing means establishes connection, it is not necessary for the user to carry out an operation for specifying a communication counterpart device to transmit the obtained content data to the communication counterpart device. That is, according to the arrangement, it is possible to easily share content data with the communication counterpart device.

It is preferable to arrange the communication device according to the present invention so as to further comprise: transmission initiation request transmission means for transmitting, to said another communication device, a transmission initiation request for requesting initiation of transmission of the content data; and response receiving means for receiving a response to the transmission initiation request which response is transmitted from said another communication device upon receiving the transmission initiation request, wherein the content data transmission means transmits the content data to said another communication device when the response received by the response receiving means is indicative of acceptance of the transmission initiation request.

According to the arrangement, the content data is transmitted to the communication counterpart device only in case where the communication counterpart device transmits a response indicative of acceptance of the transmission initiation request transmitted by the transmission initiation request transmission means and the response receiving means receives the response.

Thus, according to the arrangement, the communication counterpart device can reject reception of the content data in case where it is inappropriate to receive the content data. That is, the communication device can avoid transmitting content data, whose reception in the communication counterpart device is determined as being inappropriate, to the communication counterpart device. Herein, examples of the case where reception of the content data is inappropriate include a case where the communication counterpart device is not suitable for reproduction of the content data, a case where the user of the communication counterpart device does not intend to share the content data, and a similar case.

Thus, according to the arrangement, it is possible to share with the communication counterpart device only content data whose reception in the communication counterpart device is determined as being appropriate.

It is preferable to arrange the communication device according to the present invention so as to further comprise: transmission initiation request transmission means for transmitting, to said another communication device, a transmission initiation request for requesting initiation of transmission of the content data; and response receiving means for receiving a response to the transmission initiation request which response is transmitted from said another communication device upon receiving the transmission initiation request, wherein when the response received by the response receiving means requests transmission of the content data to a specific communication device, the content data transmission means regards the specific communication device as a communication device to which the obtained content data should be transmitted.

According to the arrangement, a communication device specified in the response to the transmission initiation request which response has been received from the communication counterpart device is specified as a transmission destination of the content data. Thus, in case where it is desired to receive the content data by another communication device, it is possible to set the communication device to transmit the content data to said another communication device. That is, the communication device can specify a communication device desired by the communication counterpart device as a transmission destination of the content data.

Thus, according to the arrangement, the user of the communication device can transmit content data to a communication device desired by the communication counterpart device without carrying out an operation for specifying a transmission destination of the content data.

It is preferable to arrange the communication device according to the present invention so that if communication connection with said another communication device is not established at a time when the content data obtaining means obtains the content data, the communication connection establishing means establishes communication connection with another specific communication device having been preset in advance.

According to the arrangement, even if communication connection between the communication device and said another communication device has not been established at a time when the content data obtaining means obtains the content data, the communication connection establishing means allows communication connection with the preset specific communication counterpart device to be established.

Thus, even though communication connection with the communication counterpart device has not been established at a time when the content data is obtained, if a communication counterpart device has been preset in the communication device, the content data can be transmitted to the preset communication counterpart device only by causing the communication device to obtain the content data from the outside without carrying out any other operation with respect to the communication device.

It is preferable to arrange the communication device according to the present invention so that when the content data obtaining means receives the content data via a specific interface having been preset in advance, the content data transmission means transmits the content data to said another communication device.

According to the arrangement, the content data transmission means allows only the content data obtained via a preset specific interface to be transmitted to the communication counterpart device. That is, an external device which can cause the communication device to obtain the content data so as to transmit the content data to the counterpart device via the communication device is limited to an external device which causes the communication device to obtain the content data via the preset specific interface.

Thus, if an interface of an external device which may transmit content data to the counterpart device via the communication device is preset in the communication device, it is possible to prevent content data transmitted from an unexpected external device from being transmitted to the communication counterpart device unexpectedly.

Note that, examples of the interface include: at least, a communication device for receiving content data transmitted from an external device; and a reproduction device for reading out data from a storage medium storing therein content data. Further, "to specify an interface" means also "to specify a reception port" or "to specify a protocol".

It is preferable to arrange the communication device according to the present invention so as to further comprise content data determination means for determining whether or not a type of the content data obtained by the content data obtaining means is identical to a specific type having been preset in advance, wherein when the content data determination means determines that the type of the content data is identical to the specific type having been preset in advance, the content data transmission means transmits the content data to said another communication device.

According to the arrangement, the content data determination means and the content data transmission means allow content data which can be transmitted to the communication counterpart device to be limited to content data of a specific type which has been preset in advance. Thus, if a type of content data which may be transmitted to the communication counterpart device is specified in advance, it is possible to prevent unexpected content data from being transmitted to the communication counterpart device unexpectedly.

It is preferable to arrange the communication device according to the present invention so as to further comprise content data output means for outputting the content data obtained by the content data obtaining means to a display which allows the communication device to transmit a display signal thereto, wherein the content data output means begins to transmit the content data and begins to output the content data to the display at the same time.

According to the arrangement, the content data transmission means and the content data output means allow for initiation of output of the content data to the display at the same time as initiation of transmission of the content data to the communication counterpart device. Thus, if output of the content data to the display is initiated at the same time as reception of the content data is initiated also in the communication counterpart device, it is possible to synchronize the communication device and the communication counterpart device with each other in the initiation of output of the content data to the display.

Thus, according to the arrangement, the user of the communication device and the user of the communication counterpart device can view the shared content data at the same time.

It is preferable to arrange the communication device according to the present invention so as to further comprise content-data-obtaining-request receiving means for receiving a content-data-obtaining request which is transmitted from said another communication device having received the transmission initiation request and which requests the content data to be obtained, wherein when the content-data-obtaining-request receiving means receives the content-data-obtaining request, the content data transmission means transmits the content data to said another communication device.

According to the arrangement, the content data is transmitted to the communication counterpart device only in case where the communication counterpart device having received the transmission initiation request transmission means transmits the content-data-obtaining request and the content-data-obtaining request receiving means receives the content-data-obtaining request.

Thus, according to the arrangement, the communication counterpart device can receive the content data when it is necessary to receive the content data. That is, the communication device can transmit the content data to the communication counterpart device when the content data has to be received in the communication counterpart device. Herein, an example of the case where the content data has to be received in the communication counterpart device includes a case where the user of the communication counterpart device desires to share the content data.

Thus, according to the arrangement, it is possible to share the content data with the communication counterpart device only when it is determined that the content data has to be received in the communication counterpart device.

It is preferable to arrange the communication device according to the present invention so as to further comprise communication device determination means for determining whether or not the communication device having transmitted the response and the communication device having transmitted the content-data-obtaining request are identical to each other, wherein when the communication device determination means determines that the communication device having transmitted the response and the communication device having transmitted the content-data-obtaining request are not identical to each other, the content data transmission means does not transmit the content data.

According to the arrangement, even if the content-data-obtaining request is obtained not from the communication counterpart device having responded to the transmission initiation request but from other communication device, the transmission means does not transmit the content data in response to the content-data-obtaining request. That is, according to the arrangement, it is possible to prevent an unexpected third communication device which is not the communication device having responded to the transmission initiation request from obtaining the content data. Thus, according to the arrangement, it is possible to decrease a possibility that the content data may leak to an unexpected third party.

It is preferable to arrange the communication device according to the present invention so that: the transmission initiation request includes time specifying information for specifying a time for the content-data-obtaining-request receiving means to receive the content-data-obtaining request, and the content-data-obtaining-request receiving means does not receive the request at a time other than the specified time.

According to the arrangement, the content-data-obtaining request receiving means does not receive the request at a time other than the specified time. Thus, the transmission means does not transmit the content data at a time other than the specified time. Thus, it is possible to decrease a possibility that an unexpected third communication device may obtain the content data. Moreover, with reference to the time specifying information included in the transmission initiation request, the communication counterpart device having obtained the transmission initiation request can obtain the content data within the specified time.

That is, according to the arrangement, it is possible to decrease a possibility that the content data may leak to an unexpected third party without inhibiting the communication counterpart device having obtained the transmission initiation request from obtaining the content data.

It is preferable to arrange the communication device according to the present invention so that: the content data is streaming data, and the content data transmission means begins streaming transmission of the content data at a time when the content data obtaining means begins to obtain the content data.

According to the arrangement, the transmission means allows for synchronization of a timing at which the communication device begins to obtain the streaming data and a timing at which the communication counterpart device begins to receive the streaming data.

Thus, according to the arrangement, the communication device and the communication counterpart device can be synchronized with each other in reproduction.

It is preferable to arrange the communication device according to the present invention so that the content data transmission means transmits the content data only to a specific communication device out of plural other communication devices with which the communication connection establishing means establishes communication connection.

According to the arrangement, it is possible to transmit the content data only to a specific communication device out of the plural communication devices with which the communication device establishes connection.

It is preferable to arrange the communication device according to the present invention so that the specific communication device is, out of the plural other communication devices with which the communication connection establishing means establishes communication connection, a communication device included in a sharable communication device list in which communication devices allowed to share content data of the communication device are listed.

According to the arrangement, it is possible to transmit the content data only to the communication device, included in the sharable communication device list, out of the plural communication devices with which the communication device establishes connection. The sharable communication device list is a list in which communication devices allowed to share content data of the communication device are listed. Thus, according to the arrangement, it is possible to share the content data only with a communication device allowed to share the content data in the communication device.

It is preferable to arrange the communication device according to the present invention so as to further comprise: display means for displaying, in the display which allows the communication device to transmit a display signal thereto, a list of the plural other communication devices with which the communication connection establishing means establishes communication connection; and communication device selection means for allowing a user to select at least one communication device from the plural other communication devices displayed in the display, wherein the specific communication device is said at least one communication device selected by the user with the communication device selection means.

According to the arrangement, the user can select at least one communication device, by the communication device selection means, out of the plural communication devices with which the communication device establishes connection. Thus, according to the arrangement, it is possible to share the content data only with a communication device particularly selected by the user out of the plural communication devices with which the communication device establishes connection.

It is preferable to arrange the communication device according to the present invention so as to further comprise electronic mail transmission means for generating an electronic mail including the content data obtained by the content data obtaining means so as to transmit the electronic mail to an electronic mail address, wherein when the content data transmission means fails to transmit the content data, the electronic mail transmission means transmits the electronic mail to the electronic mail address which has been beforehand associated with each of the plural other communication devices with which the communication connection establishing means establishes communication connection.

According to the arrangement, in case where the content data transmission means fails to transmit the content data to the communication counterpart device, the content data is included in the electronic mail so as to be transmitted to the electronic mail address which has been beforehand associated with the communication counterpart device. Thus, according to the arrangement, even if the transmission means fails to transmit the content data to the communication counterpart device, the content data can be shared by the communication device and the device for receiving the electronic mail.

For example, if the communication counterpart device is associated with the electronic mail address of the user of the communication counterpart device, it is possible to realize such condition that: the user of the communication counterpart device receives the electronic mail transmitted to his or her electronic mail address, so that the content data can be shared by the user of the communication device and the user of the communication counterpart device.

It is preferable to arrange the communication device according to the present invention so as to further comprise: content data storage means for storing therein content data sets obtained by the content data obtaining means so as to generate a content data list in which the stored content data sets are listed; content data list transmission means for transmitting the content data list to said another communication device; and content-data-obtaining-request receiving means for receiving a content-data-obtaining request for obtaining at least one content data set included in the content data list which request is transmitted from said another communication device having received the content data list, wherein the content data transmission means transmits said at least one content data set, which has been requested to be obtained, to said another communication device having received the content data list.

According to the arrangement, it is possible to transmit, to the communication counterpart device, said at least one content data set which is one of the plural content data sets stored in the content data storage means and which the communication device having received the content data list requests to obtain through the content-data-obtaining request. Thus, according to the arrangement, it is possible to share said at least one content data set, which the communication counterpart device particularly requests to obtain, out of the plural content data sets stored in the content storage means.

In order to solve the foregoing problems, a communication device according to the present invention comprises: communication means which allows a communication with other communication device and which allows a real-time communication between a user thereof and a user of a communication counterpart device; content data receiving means for receiving content data from the outside; and content data transmission means for transmitting the content data received by the content data receiving means to the communication counterpart device with which the communication means communicates.

Further, in order to solve the foregoing problems, a communication method according to the present invention comprises: a communication step in which a communication with other communication device is allowed and a real-time communication between a user thereof and a user of a communication counterpart device is allowed; a content data receiving step in which content data is received from the outside; and a content data transmission step in which the content data received in the content data receiving step is transmitted to the communication counterpart device with which the communication means communicates.

According to the arrangement, the communication device can transmit the content data received from the outside to the communication counterpart device. That is, the user of the communication device can share the content data, received by the communication device, with the user of the communication counterpart device while carrying out a real-time communication with the user of the communication counterpart device. At this time, the user does not have to carry out an operation for specifying the communication counterpart device as a transmission destination of the received content data. Thus, according to the arrangement, the user of the communication device and the user of the communication counterpart device can easily share the content data while carrying out a real-time communication.

Note that, the content data receiving means can be arranged as an infrared reception port for receiving content data transmitted from a mobile phone device by an infrared ray carrier wave for example. Further, the content data receiving process can be realized as a process for receiving content data transmitted from a mobile phone device by an infrared ray carrier wave for example. In this case, the user of the communication device can share the content data with the user of the communication counterpart device only by transmitting the content data from the mobile phone device to the communication device.

Note that, the communication device can be realized as a terminal device of a television conference system for example. Alternatively, the communication device can be realized as a calling device which makes a call by a television phone or IP phone. In any case, the user of the communication device and the user of the communication counterpart device can easily share the content data while carrying out a real-time communication.

It is preferable to arrange the communication device according to the present invention so as to further comprise content data determination means for determining a type of the content data received by the content data receiving means, wherein when the content data received by the content data receiving means is of a specific type having been preset in advance, the content data transmission means transmits the content data to the communication counterpart device.

According to the arrangement, content data which the communication device can transmit to the communication counterpart device is limited to content data of a specific type having been preset in advance. That is, it is possible to preset a type of content data which is to be shared with the communication counterpart device.

It is preferable to arrange the communication device according to the present invention so as to further comprise user operation receiving means for receiving a user operation indicative of whether or not to transmit the content data received by the content data receiving means to the communication counterpart device with which the communication device communicates, wherein the content data transmission means transmits the content data to the communication counterpart device in accordance with the user operation received by the user operation receiving means.

According to the arrangement, in case where the user gives an instruction to transmit content data to the communication counterpart device, content data received from the outside is transmitted to the communication counterpart device. Thus, it is possible to decrease such risk that content data may be unintentionally transmitted to the communication counterpart device.

It is preferable to arrange the communication device according to the present invention so as to further comprise storage means for storing therein a sharable communication device list in which sharable communication device information sets for specifying other communication devices allowed to share the content data are listed, wherein when the communication counterpart device with which the communication means communicates is specified by the sharable communication device specifying information sets included in the sharable communication device list, the content data transmission means transmits the content data received by the content data receiving means to the communication counterpart device.

According to the arrangement, in case where the sharable communication device specifying information for specifying the communication counterpart device being in communications is included in the sharable communication device list, the content data received from the outside is transmitted to the communication counterpart device. Thus, it is possible to decrease such risk that content data may be transmitted to a communication counterpart device which is not allowed to share the content data.

Note that, any information can be used as the sharable communication device specifying information as long as the information can be used to specify other communication device. The information may be information, such as a product number, which is assigned to said other communication device in a fixed manner or may be information, such as a telecommunication number (telephone number) and a communication address (IP address, VoIP address (SIP address) or the like), which is assigned to said other communication device in a fixed manner or in a fluid manner in a communication system including the communication device of the present invention and said other communication device.

Further, the sharable communication device list can be realized as a database, such as a phone book, in which communication device specifying information for specifying other communication device is stored with it associated with a flag indicative of whether or not to allow content data to be shared between the communication device and said other communication device.

The database may manage communication device specifying information sets so that not only a flag indicative of whether or not to allow content data to be shared with a communication device specified by the communication device specifying information but also a user name ("Mr. Ando" "Mr. Ito" etc.), a device name ("Infrared ray" "Bluetooth" (registered trademark) etc), or a content type ("Moving image" "Still image" "Music" etc.) are associated with each information set.

The database may be arranged so that: In case where a certain device name is associated with the communication device specifying information, the content data transmission means transmits the content data only when the content data which should be transmitted is obtained via a device specified by the device name. Further, the database may be arranged so that: a content type is associated with the communication device specifying information, the content data transmission means transmits the content data only when the content data which should be transmitted corresponds to the content data type.

In order to solve the foregoing problems, a communication device of the present invention comprises: communication means which allows a communication with other communication device and which allows a real-time communication between a user thereof and a user of a communication counterpart device; content data receiving means for receiving content data from the outside; and share initiation request transmission means for transmitting a share initiation request for requesting initiation of share of the content data to the communication counterpart device, with which the communication means communicates, when the content data receiving means receives the content data.

Further, in order to solve the foregoing problems, a communication method according to the present invention comprises: a communication step in which a communication with other communication device is allowed and a real-time communication between a user thereof and a user of a communication counterpart device is allowed; a content data receiving step in which content data is received from the outside; and a share initiation request transmission step in which a share initiation request for requesting initiation of share of the content data is transmitted to the communication counterpart device, with which the communication means communicates, when the content data receiving means receives the content data.

According to the arrangement, the communication device can transmit, to the communication counterpart device, the share initiation request for requesting initiation of share of the content data received from the outside. Thus, the communication counterpart device can obtain the content data, received by the communication device, from the communication device in accordance with the share initiation request. That is, the user of the communication device can share the content data received by the communication device with the user of the communication counterpart device while carrying out a real-time communication with the user of the communication counterpart device. At this time, the user of the communication device does not have to carry out an operation for specifying the communication counterpart device as a transmission destination of the received content data. Thus, according to the arrangement, the user of the communication device and the user of the communication counterpart device can easily share content data while carrying out a real-time communication.

Note that, according to the arrangement, the communication counterpart device does not have to obtain the content data, received by the communication device, in response to the share initiation request. That is, in case where the user of the communication counterpart device does not intend to share the content data for example, the communication counterpart device can refuse share of the content data in response to the share initiation request.

It is preferable to arrange the communication device according to the present invention so as to further comprise content data determination means for determining a type of the content data received by the content data receiving means, wherein when the content data received by the content data receiving means is of a specific type having been preset in advance, the share initiation request transmission means transmits the share initiation request for requesting initiation of share of the content data.

According to the arrangement, content data which can be shared by the communication device with the communication counterpart device is limited to content data of a specific type having been preset in advance. That is, it is possible to preset a type of content data which is to be shared with the communication counterpart device.

It is preferable to arrange the communication device according to the preset invention so as to further comprise user operation receiving means for receiving a user operation indicative of whether or not to share the content data received by the content data receiving means with the communication counterpart device with which the communication means communicates, wherein the share initiation request transmission means transmits the share initiation request for requesting initiation of share of the content data to the communication counterpart device in accordance with the user operation received by the user operation receiving means.

According to the arrangement, in case where the user instructs the communication counterpart device to share content data, the share initiation request is transmitted to the communication counterpart device. Thus, it is possible to decrease such risk that content data may be unintentionally shared with the communication counterpart device.

It is preferable to arrange the communication device according to the present invention so as to further comprise storage means for storing therein a sharable communication device list in which sharable communication device information sets for specifying other communication devices allowed to share the content data are listed, wherein when the communication counterpart device with which the communication means communicates is specified by the sharable communication device information sets included in the sharable communication device list, the share initiation request transmission means transmits the share initiation request for requesting initiation of share of the content data to the communication counterpart device.

It is preferable to arrange the communication device according to the present invention so as to further comprise storage means for storing therein a sharable communication device list in which sharable communication device information sets for specifying other communication devices allowed to share the content data are listed, wherein when the communication counterpart device with which the communication means communicates is specified by the sharable communication device specifying information sets included in the sharable communication device list, the share initiation request transmission means transmits the share initiation request for requesting initiation of share of the content data to the communication counterpart device.

According to the arrangement, in case where the sharable communication device specifying information for specifying the communication counterpart device being in communications is included in the sharable communication device list, the share initiation request is transmitted to the communication counterpart device. Thus, it is possible to decrease such risk that content data may be shared with a communication counterpart device which is not allowed to share the content data.

Note that, any information can be used as the sharable communication device specifying information as long as the information can be used to specify other communication device. The information may be information, such as a product number, which is assigned to said other communication device in a fixed manner or may be information, such as a telecommunication number (telephone number) and a communication address (IP address, VoIP address (SIP address) or the like), which is assigned to said other communication device in a fixed manner or in a fluid manner in a communication system including the communication device of the present invention and said other communication device.

Further, the sharable communication device list can be realized as a database, such as a phone book, in which communication device specifying information for specifying other communication device is stored with it associated with a flag indicative of whether or not to allow content data to be shared between the communication device and said other communication device.

The database may manage communication device specifying information sets so that not only a flag indicative of whether or not to allow content data to be shared with a communication device specified by the communication device specifying information but also a user name ("Mr. Ando" "Mr. Ito" etc.), a device name ("Infrared ray" "Bluetooth" (registered trademark) etc.), or a content type ("Moving image" "Still image" "Music" etc.) are associated with each information set.

The database may be arranged so that: In case where a certain device name is associated with the communication device specifying information, the share initiation request transmission means transmits the share initiation request only when the content data which should be shared is obtained via a device specified by the device name. Further, the database may be arranged so that: if a content type is associated with the communication device specifying information, the share initiation request transmission means transmits the share initiation request only when the content data which should be shared corresponds to the content data type.

It is preferable to arrange the communication device according to the present invention so as to further comprise: response receiving means for receiving a response to the share initiation request from the communication counterpart device; and electronic mail transmission means for transmitting an electronic mail including the content data to an electronic mail address having been beforehand associated with the communication counterpart device when the response received by the response receiving means gives an instruction to transmit the electronic mail including the content data received by the content data receiving means.

According to the arrangement, content data received from the outside can be transmitted by an electronic mail to an electronic mail address which has been beforehand associated with the communication counterpart device. For example, if the communication counterpart device and an electronic mail address of the user of the communication counterpart device are beforehand associated with each other, it is possible to transmit content data, received from the outside, to the electronic mail address of the user of the communication counterpart device upon receiving the content data.

Thus, the user of the communication counterpart device can obtain content data, which the user of the communication device is to share, by using any device having an electronic mail receiving function.

In order to solve the foregoing problems, a communication method according to the present invention comprises: a communication connection establishing step in which communication connection with other communication device is established; a content data obtaining step in which content data is obtained from the outside; and a transmission destination specifying step in which another communication device is specified as a communication device, to which the obtained content data should be transmitted, if connection with said another communication device is established when the content data is obtained in the content data obtaining step.

According to the arrangement, the transmission destination specifying step allows another communication device (communication counterpart device) to be specified as a communication device, to which the obtained content data should be transmitted, if connection with the counterpart device is established when the content data is obtained in the content data obtaining step. That is, according to the arrangement, it is possible to specify a communication counterpart device, with which communication connection is established, as a device, to which the obtained content data should be transmitted, without necessity for the user to carry out any operation.

Thus, according to the arrangement, if connection with a communication counterpart device is established in obtaining content data, it is not necessary for the user to carry out an operation for specifying a communication counterpart device to transmit the obtained content data to the communication counterpart device. That is, according to the arrangement, it is possible to easily share content data with the communication counterpart device.

Note that, also a communication system including the aforementioned communication device is included in the scope of the present invention.

That is, in order to solve the foregoing problems, a communication system according to the present invention comprises: the aforementioned communication device; and other communication device with which the communication device establishes communication connection or other communication device which allows a real-time communication between a user of said other communication device and a user of that communication device.

Note that, the communication device may be realized by a computer. In this case, the scope of the present invention includes also (i) a program causing a computer to function as the means of the aforementioned communication device and (ii) a computer-readable storage medium storing therein the foregoing program.

Additional objects, features, and strengths of the present invention will be made clear by the description below. Further, the advantages of the present invention will be evident from the following explanation in reference to the drawings.

BRIEF DESCRIPTION OF DRAWINGS

FIG. 2(b) is an explanatory drawing illustrating an example where a content data list is displayed in the communication device according to the present invention.

FIG. 8 is an explanatory drawing illustrating a setting format for specifying obtained content data.

FIG. 10 is an explanatory drawing for illustrating a format of a transmission initiation request (share initiation request) in the present invention.

FIG. 11 is a communication sequence diagram illustrating another communication method carried out between two communication devices according to the present invention.

FIG. 13 is an explanatory drawing for illustrating another transmission initiation request (share initiation request) in the present invention.

FIG. 17 is another explanatory drawing for describing another transmission initiation request (share initiation request) in the present invention.

FIG. 19 is an explanatory drawing describing a format of a sharable communication device.

FIG. 20 is a flow chart illustrating another alternative example of a content share initiation process in the present invention.

EXPLANATION OF REFERENCE NUMERALS

1 Video communication device (communication device)
1a Main body
1b Remote controller (communication device selection means, user operation receiving means)
2 Communication control section (communication connection establishing means)
3 Communication processing section (communication means, transmission initiation request transmission means, share initiation request transmission means, content-data-receiving request receiving means, response receiving means)
4 Communication input section
5 Communication output section (content data outputting means)
6 Communication receiving section (content data obtaining means, content data receiving means, content data determination means)
7 Content storage section (content data storage means)
8 Content transmission section (content data transmission means)
9 Reception buffer
10 Transmission buffer
11 Ethernet I/F
12 Camera
13 Microphone
14 Display
15 Speaker
16 Bluetooth module (interface)
17 Infrared reception port (interface)
18 SD memory card slot (interface)
19 Flash memory (storage means)
20 CPU
21 ROM
22 RAM

BEST MODE FOR CARRYING OUT THE INVENTION

With reference to FIG. 1 to FIG. 8, the following describes one embodiment of a communication device according to the present invention. Note that, the following assumes that the present invention is applied as a video communication device which functions as a terminal device of a television conference system, but the present invention is not limited to this.

Figure 1:
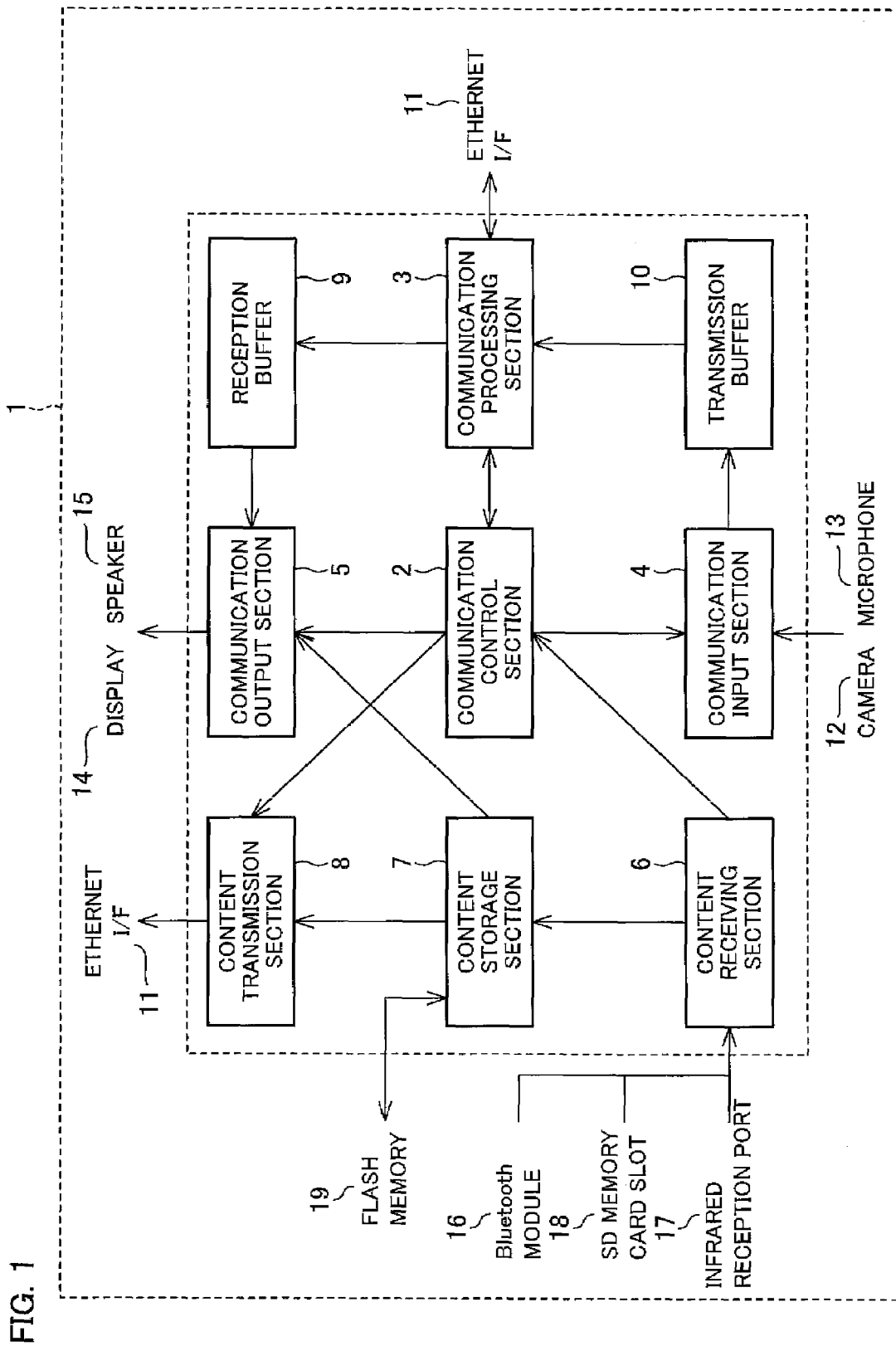
FIG. 1 is a block diagram illustrating an essential arrangement of the communication device according to the present invention.
Figure 2:
FIG. 2(*a*) is an explanatory drawing illustrating a format of a content data list of the communication device according to the present invention.

With reference to FIG. 1, a video communication device 1 according to the present embodiment is described as follows. FIG. 1 is a block diagram illustrating a software configuration of the video communication device 1. As illustrated in FIG. 1, the video communication device 1 includes a communication control section 2, a communication processing section 3, a communication input section 4, a communication output section 5, a content receiving section 6, a content storage section 7, and a content transmission section 8.

First, the following describes a basic arrangement for causing the video communication device 1 to function as a television conference system terminal device. This arrangement includes the communication control section 2, the communication processing section 3, the communication input section 4, and the communication output section 5, all of which are illustrated in FIG. 1.

The communication control section 2 controls the communication processing section 3, the communication input section 4, and the communication output section 5, and establishes a call session with another video communication device serving as a counterpart device, thereby realizing reception and transmission of video data and audio data therebetween.

The establishment of the call session with the counterpart device is realized by controlling "call control signaling" between the video communication device 1 and the counterpart device which carry out communication call with use of SIP. That is, the communication control section 2 receives and transmits a call control signal based on SIP from and to the counterpart device via the communication processing section 3, thereby establishing communication connection with the counterpart device. Further, the communication control section 2 instructs the communication processing section 3 to initiate and finish reception/transmission of video/audio data in accordance with media communication content on which negotiation is carried out in the session.

When the communication session with the counterpart device is established, the communication control section 2 transmits various types of control signals to the communication input Section 4 and causes the communication input section 4 to initiate entry of video/sound. Specifically, the communication control section 2 transmits, to the communication input section 4, (i) an instruction to input a video/audio signal generated in a camera 12/microphone 13, (ii) notification of codec on which negotiation is carried out in the call session, (iii) an instruction to encode video/audio data by the codec, and (iv) an instruction to write the encoded video/audio data into a transmission buffer 10. Further, also in case where content of the call session is changed, the communication control section 2 transmits a similar control signal to the communication input section 4 so as to manage the call session.

Further, when the call session with the counterpart device is established, the communication control section 2 transmits various types of control signals to the communication output section 5, so as to cause the communication output section 5 to begin to output the video/audio having been received by the communication output section 5. Specifically, the communication control section 2 transmits, to the communication output section 5, (i) an instruction to initiate reading of video/audio data from a reception buffer 9, (ii) notification of codec on which negotiation is carried out in the call session, (iii) an instruction to initiate decoding of the video/audio data by the codec, and (iv) an instruction to initiate output of the decoded video/audio data to a display 14/speaker 15. Further, also in case of changing the content of the call session, the communication control section 2 transmits a similar control signal to the communication output section 5 and manages the call session.

The communication processing section 3 carries out communications with the counterpart device via the Ethernet (registered trademark) I/F11 in accordance with a predetermined protocol.

At the time of establishment of the session, the communication processing section 3 transmits/receives the call control signal. Specifically, upon receiving an instruction to transmit a request or response message, the communication processing section 3 transmits the message to the counterpart device as a message based on SIP. Further, upon receiving a request or a response message based on SIP from the counterpart device, the communication processing section 3 notifies to the communication control section 2 that the message has been received.

After establishment of the session, the communication processing section 3 transmits/receives audio data and video data. Specifically, upon receiving a data transmission instruction from the communication control section 2, the communication processing section 3 reads out audio data and video data from the transmission buffer 10, and generates an RTP packet including the data, and transmits the generated RTP packet to the counterpart device with which connection has been established in the session. Adversely, when reception of video/audio data in a port specified in the session is initiated, the communication processing section 3 temporarily stores the data in the reception buffer 9.

The communication input section 4 encodes a video signal having been generated by the camera 12 and a audio signal having been generated by the microphone 13 in accordance with the codec notified by the communication control section 2, and writes the encoded video data and audio data to the transmission buffer 10. As described above, initiation and finish of the processes carried out by the communication input section 4 are controlled by the communication control section 2.

The communication output section 5 reads out data which has been received by the communication receiving section 3 and has been written on the reception buffer 9, and decodes the data in accordance with the codec notified by the communication control section 2. Further, the communication processing section 5 outputs the decoded video data in the display 14 and outputs the audio data in the speaker 15. As described above, initiation and finish of the processes carried out by the communication output section 5 are controlled by the communication control section 2. A display image outputted in the display by the communication output section 5 will be detailed later.

Next, the following describes a feature of the video communication device 1 according to the present invention, i.e., an arrangement in which content data is received from the outside and the received content data is transmitted to a counterpart device with which connection has been established in a call session. This arrangement includes the content receiving section 6, the content storage section 7, and the content transmission section 8, all of which are illustrated in FIG. 1.

The content receiving section 6 is arranged so as to obtain content data from the outside of the video communication device 1. The video communication device 1 includes a plurality of interfaces for receiving data from the outside, and the content receiving section 6 obtains the content data via each of the interfaces. The interface of the video communication device 1 includes: a communication device for receiving content data transmitted from an external device; and a reproduction device for reading out data from a storage medium in which content data is stored.

The video communication device 1 includes an infrared reception port 17 and a Bluetooth (registered trademark) module 16 as communication devices for receiving data from an external device. The content receiving section 6 can obtain data, transmitted by the external device, via these communication devices. Further, it is possible to use the aforementioned Ethernet I/F11 as a communication device for receiving content data.

Further, the video communication device 1 includes an SD memory card reader 18 as a reproduction device for reading out data from the storage medium. When the user inserts an SD memory card, the SD memory card reader 18 reads out content data from the SD memory card and transmits the read-out content data to the content receiving section 6. As a result, the content receiving section 6 can obtain content data stored in the SD memory card in the same manner as in the case of obtaining, via the communication devices, content data having been transmitted from the external device.

Note that, the reproduction device of the video communication device 1 is not limited to the SD memory card reader. That is, any device can be used as long as the device reads out content data from each of various storage media such as disks, e.g., magnetic disks such as, floppy disks (registered trademark), optical disks, such as CD-ROMs, magnetic optical disks (MOs), mini disks (MDs), digital video disks (DVDs), and CD-Rs; cards, such as IC card (including memory cards)

and optical cards; and semiconductor memories, such as mask ROMs, EPROMs, EEPROMs, and flash ROMs. Further, the video communication device 1 does not have to internally include these reproduction devices, and may be arranged so as to include an interface such as IEEE1394 and USSB (Universal Serial Bus) and read out content data from a reproduction device connected to the interface.

Upon receiving content data, the content receiving section 6 transmits the content data to the content data storage section 7. The content data storage section 7 (content data storage means) gives a predetermined file name to each content data, having been obtained by the content receiving section 6 (content obtaining means), as a file so as to store the file in the flash memory 9. Herein, the predetermined file name may be a file name, such as undoukai.jpg, having been given to the content data in advance, or may be a file name assigned by the content data storage section 7.

Further, the content data storage section 7 (content storage means) generates a content data list in which a plurality of content data sets stored in the flash memory 19 are listed. FIG. 2(a) illustrates, as an example, a content data list generated by the content data storage section 7 in case where content data sets stored in the flash memory 19 are three JPEG data sets to which undoukai.jpg, flower.jpg, and baby.jpg have been given respectively. The content data storage section 7 gives a predetermined file name such as index.html to the generated list and retains the list in the flash memory 19 as a file.

In obtaining the content data, the content receiving section 6 detects an interface having obtained the content data, and determines whether the detected interface is identical to a preset interface or not. That is, the content receiving section 6 determines whether or not content data has been received via a preset specific interface. Further, the content receiving section 6 (content data determination means) determines whether a type of the obtained content data is identical to a preset specific type or not. In case where the content data receiving section 6 (content data obtaining means) determines that content data has been received via a preset specific interface and/or in case where the content receiving section 6 determines that a type of the obtained content data is identical to a preset specific type, the below-mentioned content transmission section 8 (content data transmission means) transmits the obtained content data to a counterpart device.

The content receiving section 6 carries out determination in terms of (i) an interface via which content data has been obtained and (ii) a data type of the content data in this manner, so that the video communication device 1 can share only content data, which has been received via a preset interface and whose data type has been preset, with a counterpart device as sharable content data.

Note that, setting of the sharable content data, that is, setting of a sharable interface, or setting of a sharable data type may be carried out just before shipment from the factory or may be arbitrarily carried out by the user after shipment from the factory. Further, it may be so arranged that: when content data is received, (i) an interface having received the content data and (ii) a type and content of the content data are displayed in a display by the communication output section 5 so as to allow the user to determine whether or not to receive the content data every time content data is received. Further, in setting the sharable interface, a port may be specified or a protocol may be specified in addition. Specific examples thereof will be described later.

Unless the call session with the counterpart device has not been established at the time when it is detected that the content receiving section 6 has obtained content data in response to the notification from the content receiving section 6, that is, at the time when the content receiving section 6 (content data obtaining section) has obtained content data, the communication control section 2 (communication connection establishing means) newly establishes a call session with another preset specific device.

In case where the call session has been established or after call session is newly established, the communication control section 2 causes the communication processing section 3 (transmission initiation request transmission means, share initiation request transmission means) to transmit, to the counterpart device, a share initiation request (transmission initiation request) for requesting initiation of share of the content data. Further, the communication control section 2 causes the communication processing section 3 (response receiving means) to receive a response to a share initiation request having been transmitted from the counterpart device.

When the response to the share initiation request which response has been received by the communication control section 2 is indicative of permission, the communication control section 2 activates an HTTP server as means for transmitting the content data to the counterpart device with which the call session has been established.

The content transmission section 8 transmits the content data, having been obtained by the content receiving section 6, to the counterpart device with which the call session has been established by the communication control section 2. In the present embodiment, the aforementioned HTTP server functions as the content transmission section 8 (content data transmission means). Herein, the content transmission section 8 which is the HTTP server transmits content data by using a port on which negotiation has been carried out in the call session.

The aforementioned share initiation request includes at least URL of the content transmission section 8 which is the HTTP server and a file name of a list file illustrated in FIG. 2(a). The counterpart device in the call session transmits, to the content transmission section 8, a GET request for obtaining a list file specified in this manner (i.e., a file storing a list of content data sets stored in the flash memory 19). Upon receiving the GET request, the content transmission section 8 transmits the requested list file to the counterpart device. Upon receiving the list file, the counterpart device displays a list of file names included in the list file so as to allow the user to select a desired file name. FIG. 2(b) illustrates an example of a display image displayed in the counterpart device. The display image illustrated in FIG. 2(b) merely displays a list of file names in a text form, but it may be so arranged that thumbnail images are generated from the received content data and the generated thumbnail images are displayed in the display image. Further, as to the list file illustrated in FIG. 2(a), it may be so arranged that the content storage section 7 automatically generates a list file including URL for the content data.

When the user selects a desired file name from the file names included in the list file, the counterpart device transmits a GET request for obtaining the selected file. When the communication processing section 3 (content-data-obtaining-request receiving means) receives the GET request, the content transmission section 8 transmits the requested file to the counterpart device. As a result, the content data received by the content receiving section 6 is transmitted to the counterpart device. Note that, a signal transmitted/received between the video communication device 1 and the counterpart device will be detailed later with reference to a communication sequence diagram.

Note that, it is preferable that the content transmissions section 8 which is an HTTP server receives an HTTP request only during a certain time period in the call session. This makes it possible to prevent the content transmission section 8 from transmitting content data to an unexpected communication device. Further, it is preferable that: the communication control section 2 carries out negotiation again with the counterpart device on a port to be used as the HTTP server, every time the content receiving section 6 receives content data, so as to change the port used by the content transmission section 8. Further, the following arrangement is preferable: The content transmission section 8 determines whether or not a device having transmitted a response to the aforementioned share initiation request is identical to a device having transmitted a GET request, i.e., a request for obtaining content data. In case where it is determined that these devices are not identical to each other, the content transmission section 8 does not respond to the GET request. As a result, it is possible to further decrease a possibility that an unexpected communication device may access the communication transmission section 8, thereby allowing content data to be shared with high security.

Further, also the following arrangement is preferable: In case where a response to the aforementioned share initiation request which response has been transmitted from the counterpart device specifies a communication address of other communication device as a device having transmitted content data, that is, in case where the response to the share initiation request requires content data to be transmitted to a specific communication device, the content transmission section 8 regards the specified communication device as a communication device to which content data should be transmitted, and content data is transmitted in response to a GET request from the specified communication device. As a result, in case where the counterpart device requires to transmit content data to other communication device, the video communication device 1 can transmit the content data to the specified communication device without requiring the user to specify a device having transmitted the request.

Note that, it may be so arranged that: Before beginning the aforementioned process for transmitting the received content data to the counterpart device with which the call session has been established, a user operation indicative of whether or not to transmit the received content data to the counterpart device is received via a below-described remote controller 1b. In this case, when an instruction to transmit the received content data is received via the remote controller 1b, the content transmission section 8 transmits the content data to the counterpart device.

Further, it may be so arranged that: Before transmitting a share initiation request to the counterpart device with which the call session has been established, a user operation indicative of whether or not to share the received content data with the counterpart device is received via the below-described remote controller 1b. In this case, when an instruction to initiate share of the received content is received via the remote controller 1b, the communication processing section 3 transmits the share initiation request for initiating share of the content data to the counterpart device.

Figure 3:
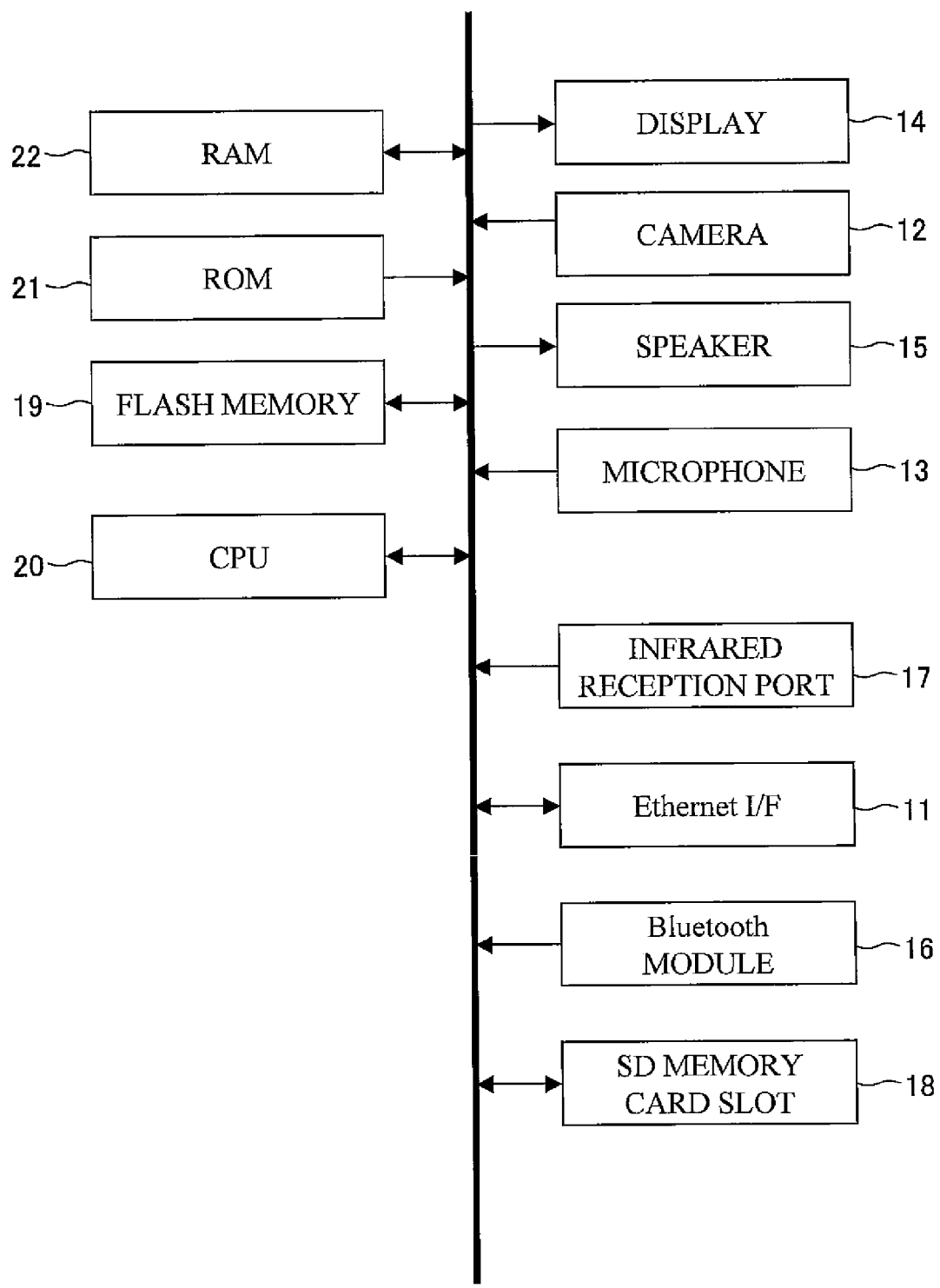
FIG. 3 is a diagram schematically illustrating a hardware configuration of the communication device according to the present invention.
Figure 4:
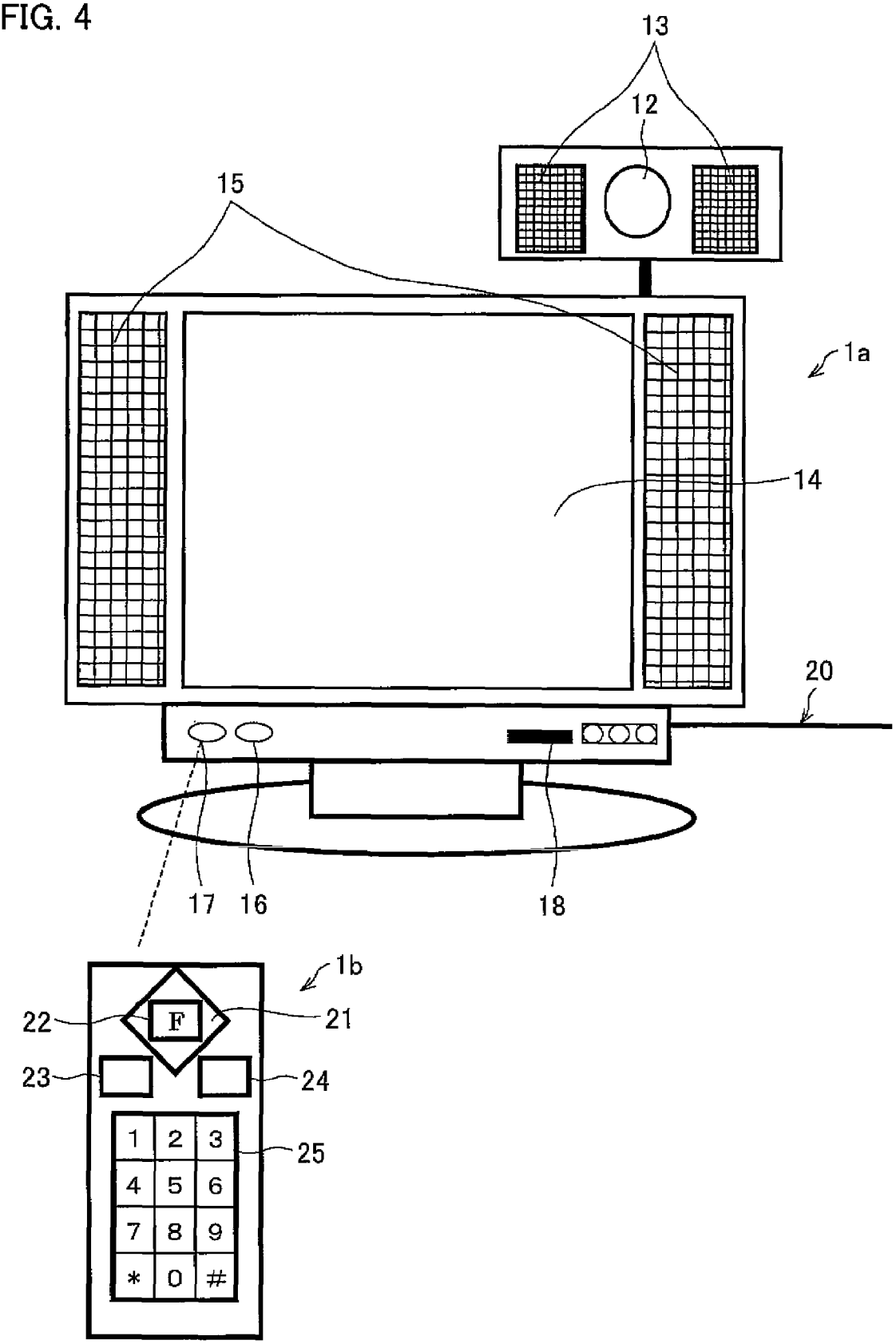
FIG. 4 is an external view illustrating an exterior of the communication device according to the present invention.

Next, with reference to FIG. 3 and FIG. 4, a hardware configuration of the video communication device 1 is described as follows. FIG. 3 is a diagram illustrating the hardware configuration of the video communication device 1. Further, FIG. 4 shows exterior of the video communication device 1.

As illustrated in FIG. 3, the video communication device 1 includes: the Ethernet I/F11; the camera 12; the microphone 13; the display 14; the speaker 15; the Bluetooth device 16; the infrared reception port 17; the SD memory card 18; the flash memory 19. In addition, the video communication device 1 includes a CPU 20, a ROM 21, and a RAM 22.

The ROM 21 stores therein a program for causing the CPU 20 to function as the communication control section 2, the communication processing section 3, the communication input section 4, the communication output section 5, the content receiving section 6, the content storage section 7, and the content transmission section 8. When the video communication device 1 is turned ON, the program stored in the ROM 21 is developed and executed by the CPU 23.

Note that, in the present embodiment, the program for causing the CPU as the aforementioned sections is stored in the ROM 21, but the present invention is not limited to this arrangement. That is, it may be so arranged that the program is stored in other program medium. Other program medium is a storage medium arranged so as to be detachable from the main body. That is, it is possible to use a storage medium or the like which holds the program in a fixed manner. Examples thereof include: tapes, such as magnetic tape and cassette tape; disks including magnetic disks, such as flexible disk and hard disk, and optical disks, such as CDs, MOs, MDs, and DVDs; cards, such as IC card (including memory cards); and semiconductor memories, such as mask ROMs, EPROMs (Erasable Programmable Read Only Memory), EEPROMs (Electrically Erasable Programmable Read Only Memory), and flash ROMs. Further, it may be so arranged that the program is downloaded from a communication network.

Data other than the program stored in the ROM 21, e.g., various setting information sets such as a communication address of the video communication device 1 and content data obtained by the content receiving section 6 are stored in the flash memory 19 via a file system.

Further, the video communication device 1 includes the camera 12, the microphone 13, the display 14, and the speaker 15. Note that, it may be so arranged that: the video communication device 1 includes a video output interface, a video input interface, a sound output interface, and a sound input interface, wherein the display, the camera, the speaker, and the microphone are connected to these interfaces respectively. That is, any display may be used as the display 14 as long as a video signal can be transmitted from the communication device to the display, and any speaker can be used as the speaker 15 as long as an audio signal can be transmitted from the communication device to the speaker.

The video communication device 1 further includes: the infrared reception port 17 for receiving data from an external device via the Internet, the Ethernet, the below-described infrared ray remote controller 1b, or an infrared ray communication; the Bluetooth module 16 for receiving data from an external device based on Bluetooth; and the SD memory card reader 18 for reading out data from the SD memory card.

As illustrated in FIG. 4, the video communication device 1 includes the main body 1a and the remote controller 1b.

As illustrated in FIG. 4, the main body 1a includes the display 14 and the speaker 15, and the camera 12 and the microphone 13 are connected to an upper portion of each of the display 14 and the speaker 15. Further, on a front face of the main body 1a, the infrared reception port 17, the Bluetooth module 16, and the SD memory card reader 18 are provided. Further, on a side face of the main body 1a, the Ethernet I/F11 is provided, and a network cable 20 is connected thereto. The flash memory 19, the CPU 20, the ROM 21, and the RAM 22 are provided in the main body 1a. The main body 1a further includes a terminal or the like which receives video and sound from an external device.

Further, as illustrated in FIG. 4, the remote controller 1b includes a cross key 21, an entry key 22, a connection key 23, a disconnection key 24, and numerical keys 25, and allows the user to input an instruction to transmit the instruction to the main body 1*a* by an infrared ray. With the remote controller 1*b*, the user pushes upper/lower portions and right/left portions of the cross key 21 so as to select an object in the display image and pushes the entry key 22 so as to determine the selected object. In this manner, the remote controller 1*b* allows the user to give instructions to the video communication device 1. Further, the user repeatedly pushes the numerical keys 25, including keys numbered 0 to 9 and two keys having signs thereon, so as to input a desired telephone number to the video communication device 1, thereby specifying a counterpart device, Further, the user pushes the connection key 23 so as to instruct the video communication device 1 to call the specified counterpart device. Further, the user pushes the disconnection key 24 so as to instruct the video communication device 1 to end the call session.

Figure 5:
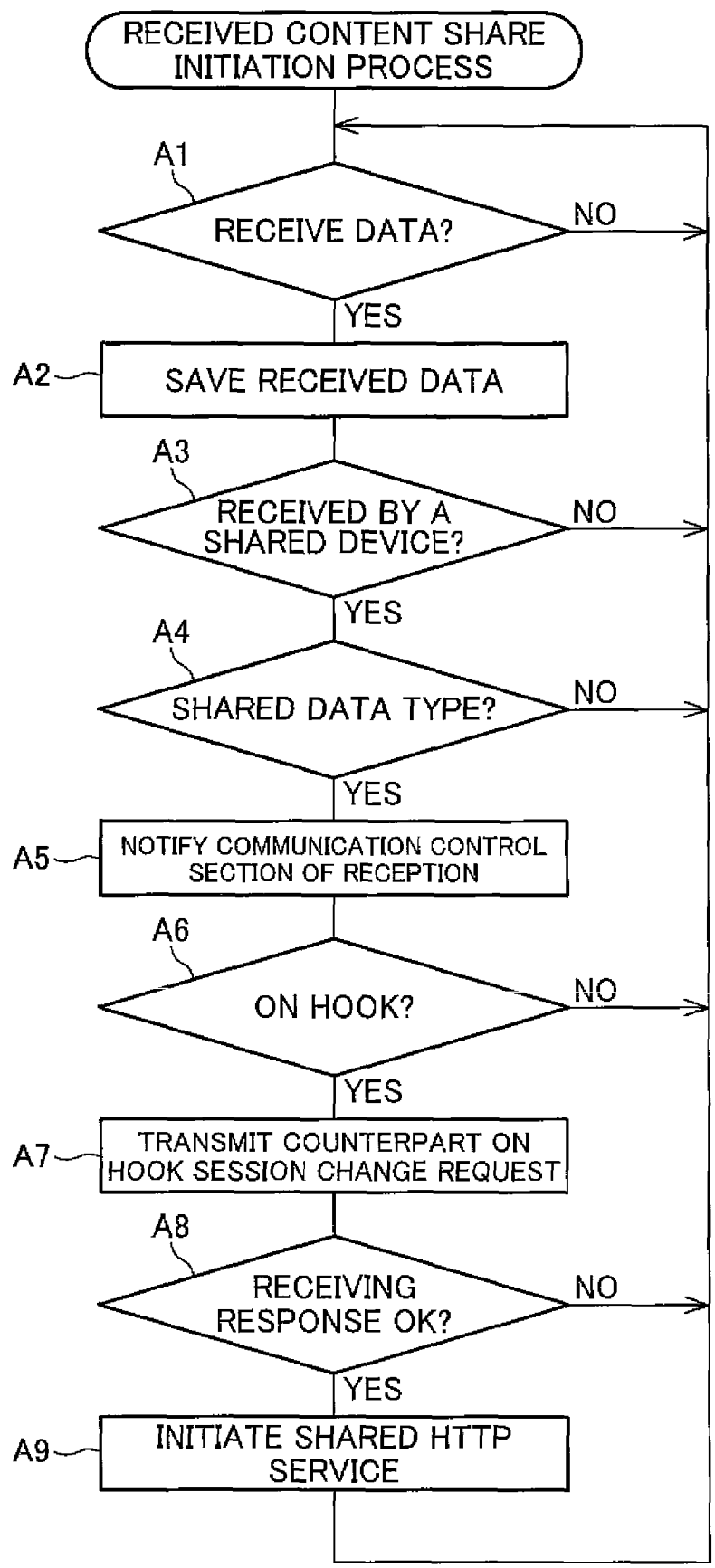
FIG. 5 is a flow chart illustrating a content share initiation process of the present invention.

Next, with reference to FIG. 5, a content share initiation process in the video communication device 1 is described as follows. FIG. 5 is a flowchart illustrating a series from a process for detecting reception of content data to a process for activating the HTTP server.

The content receiving section 6 is on standby for content data after the video communication device 1 is turned ON (process A1). When the content receiving section 6 obtains content data from the outside (A1: yes), the content receiving section 6 temporarily stores the obtained content data via the content storage section 7 into the flash memory 19 (process A2).

The content receiving section 6 determines whether an interface used to obtain the content data is identical to a preset interface or not (process A3). In the present embodiment, the setting is such that only content data having been obtained via the infrared reception port 17 is shared, and the content receiving section 6 determines whether the received content data has been obtained via the infrared port 17 or not, and in case where it is determined that the content data has been obtained via an interface other than the infrared port 17 (A3: no), the process is stopped and returns to the process A1.

In case where it is determined that the content data has been obtained via the infrared reception port 17 (A3: yes), the content receiving section 6 determines whether a data type of the obtained content data is identical to a preset data type or not (process A4). In the present embodiment, the setting is such that only JPEG data is shared, and the content receiving section 6 determines whether the obtained content data is JPEG data or not, and in case where the content data is not JPEG data (A4: no), the process stops and returns to the process A1.

In case where the content data is JPEG data (A4: yes), the content receiving section 6 notifies reception of the content data to the communication control section 2 (process A5), and the subsequent process is carried out in the communication control section 2.

The communication control section 2 determines whether a call session has been established or not (that is, whether the devices are communicating with each other or not) (process A6). If the call session has established, the communication control section 2 transmits the aforementioned share initiation request (S5: INVITE) to the counterpart device in the call session (process A7). The share initiation request is specifically a call session changing request which requires a medium for transmitting/receiving content data to be added to the current call session. The communication control section 2 receives from the counterpart device a response to the share initiation request (A8), and in case where the received response is not OK (A8: no), the process is stopped and the process is returned to the content receiving section 6. The content receiving section 6 to which the process has been returned executes the process A1.

In case where the received response is S6:OK (A8: yes), the communication control section 2 activates the HTTP server. This makes it possible to transmit the content data received by the content receiving section 6 to the counterpart device.

Note that, when the process A9 is completed, the communication control section 2 returns the process to the content receiving section 6. The content receiving section 6 to which the process has been returned repeats the aforementioned processes from the process A1.

Figure 6:
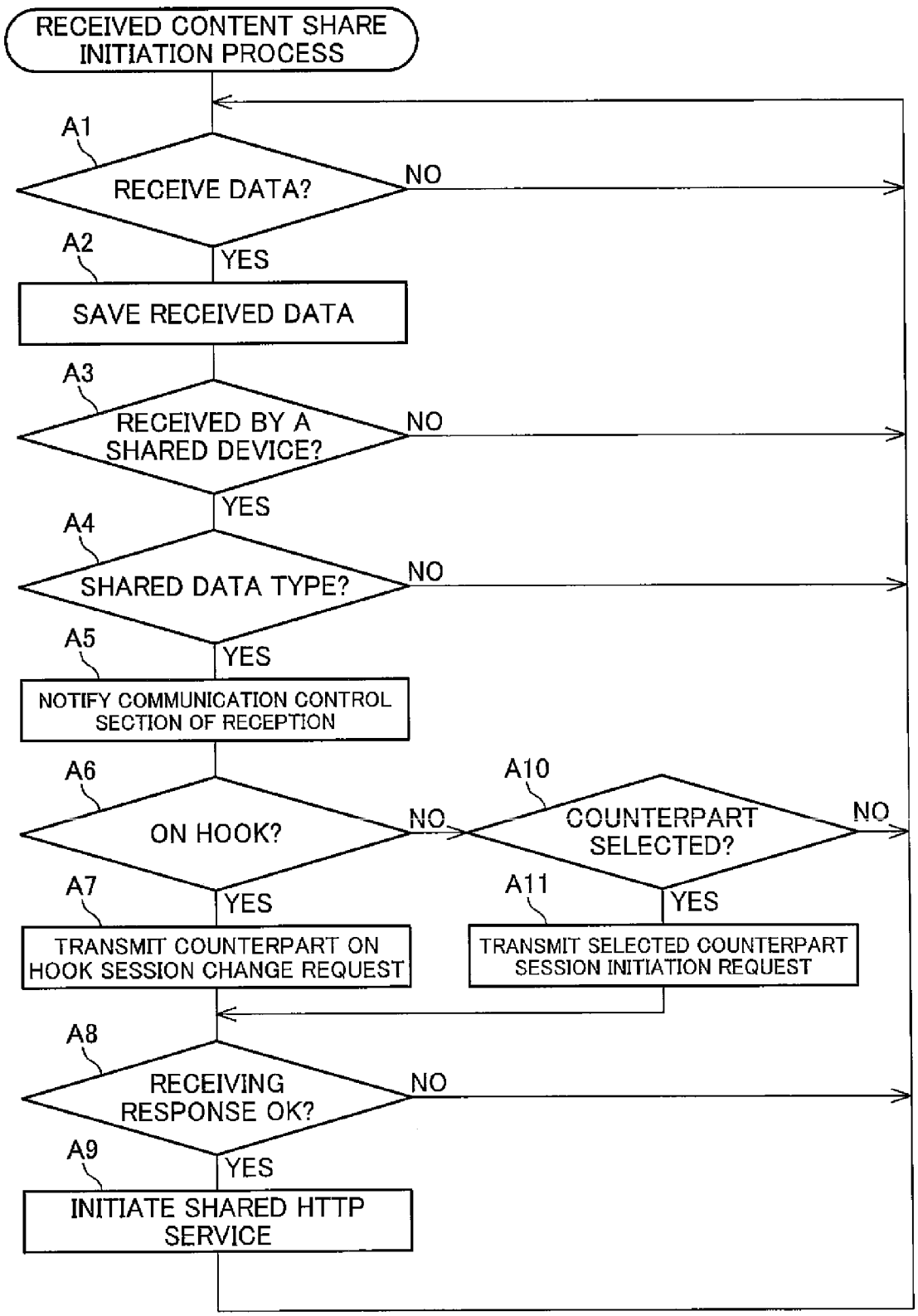
FIG. 6 is a flow chart illustrating one alternative example of a content share initiation process of the present invention.

The following describes one alternative example of the content share initiation process with reference to the flow chart illustrated in FIG. 6. The difference in the flow chart illustrated in FIG. 6 to the flow chart illustrated in FIG. 5 is that a process is added which, if it is determined that a call session has not been established in the process A6, starts a new call session with a specific counterpart as long as a counterpart device has bee specified beforehand.

The following more specifically describes the added process illustrated in the flow chart of FIG. 6. If it is determined in the process A6 that the call session has not been established (A6: no), the communication control section 2 determines whether the counterpart device has been specified beforehand (process A10). If the counterpart device has not been specified (A10: no), the process returns to the process A1. On the other hand, if the counterpart device has been specified beforehand (A10: yes), the communication control section 2 transmits the aforementioned session establishing request to the specified counterpart device and starts a new call session (process A11). The session establishing request transmitted here includes the specification of a media for transmitting/receiving the content data. This accordingly enables the performing of the following processes A8 and A9 without the need of transmission of a share initiation request in the process A7.

Note that, the specified counterpart device is the counterpart device specified in accordance with information such as a telephone number and communication address inputted by the user via the inputting means, for example the remote control 1*a*. This information is inputted by the user before the content share initiation process proceeds. The communication control section 2 stores information, which has been inputted by the user so as to specify the counterpart device, into storage means such as the flash memory 19. The specific information is referred to in the processes A10 and A11 in order to initiate the call session with the preset counterpart device.

According to the process based on the flow chart illustrated in FIG. 6, the user inputs the telephone number and other information to the video communication device 1 and then transmits desired content data to the video communication device 1 from an external device such as the mobile phone. This enables the user to immediately transmit the content data to the counterpart device.

Figure 7:
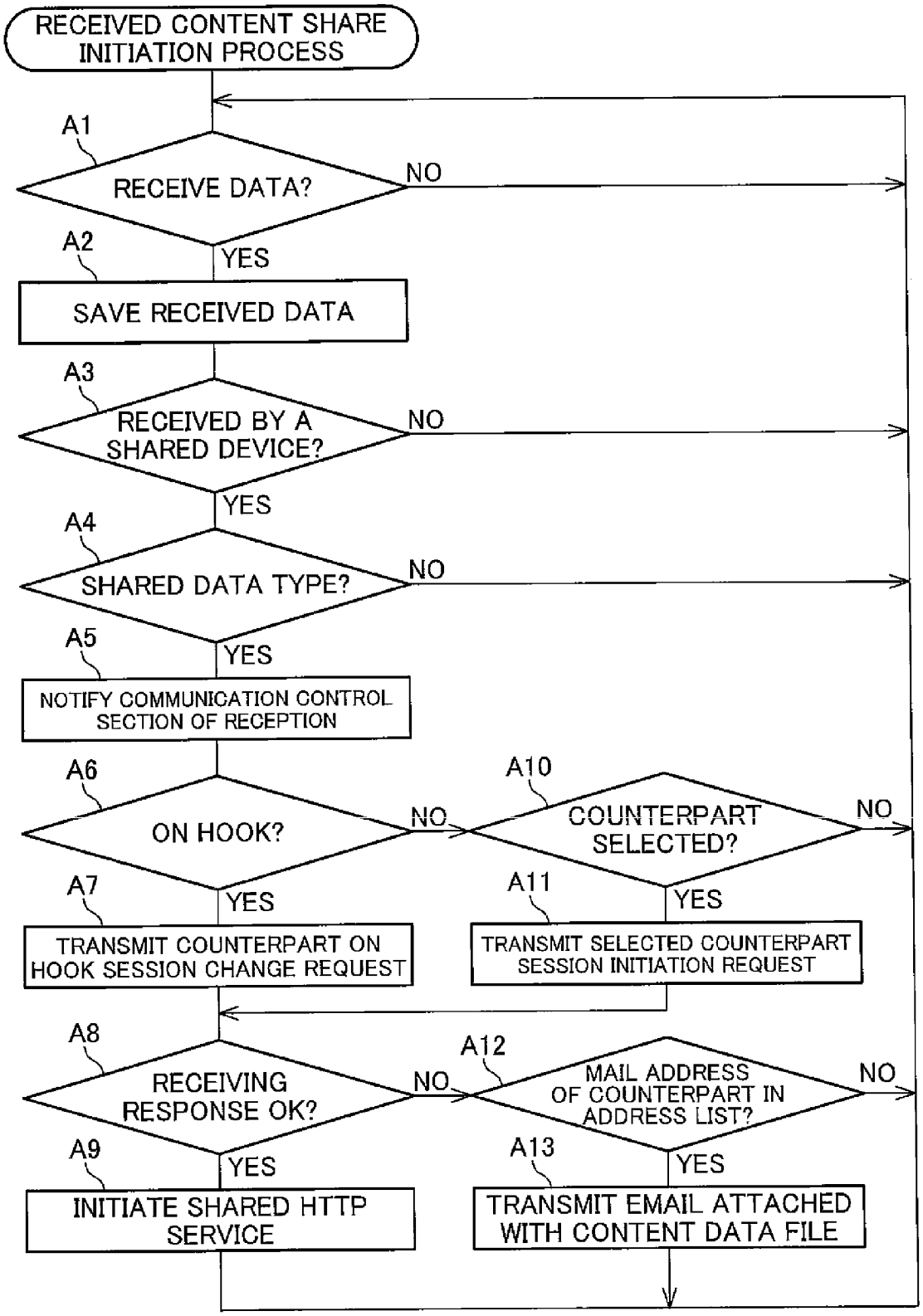
FIG. 7 is a flow chart illustrating another alternative example of a content share initiation process of the present invention.

The following describes another alternative example of the share initiation process with reference to the flow chart illustrated in FIG. 7. The difference in the flow chart illustrated in FIG. 7 to the flow chart illustrated in FIG. 6 is that a process is added to transmit the content data by different means if the response to the share initiation request received in the process A8 is not OK, that is, if the share initiation request is rejected from the counterpart device.

The video communication device 1 includes, in addition to the aforementioned arrangement, an electronic mail transmission section (not shown) transmitting an electronic mail to the specified electronic mail address and an address book database section (not shown) retaining the telephone number and the electronic mail address with them associated with each other, as an electronic mail transmission means. In the present alternative example, the video communication device 1 transmits the content data by electronic mail using this arrangement, in case where the share initiation request is rejected by the counterpart device. Means for realizing the electronic mail transmission section or the address book database section is commonly known, therefore the descriptions of these sections are omitted.

The following is a more specific description of the added process in the flow chart shown in FIG. 7. If it is determined in the process A8 that the share initiation request is rejected by the counterpart device (A8: no), the communication control section 2 transmits the telephone number of the counterpart device in the current session to the address book database section and makes an inquiry on whether or not the telephone number has an associated electronic mail address retained therein (process A12). If an electronic mail address is stored with it associated with the telephone number in the address book database (A12: yes), the communication control section 2 obtains the electronic mail address and transmits the electronic mail address and the content data to the electronic mail transmission section. The electronic mail transmission section generates an electronic mail including the content data as an attached form and transmits the electronic mail to the electronic mail address (process A13). If the electronic mail address is not stored with it associated with the telephone number (A12: no), the process is stopped and returns to the process A1.

According to the alternative example, even if the counterpart device cannot process the content data to be shared, the content data is transmitted to the electronic mail address associated with the counterpart device beforehand. In the address book database section, it is possible to store, for example, the information of the counterpart device and the electronic mail address of the user calling by using the device with them associated to each other. According to the arrangement, even if the counterpart device cannot receive the content data to be shared, it is possible to transmit the content data to the electronic mail address of the user calling by using the counterpart device. That is, the user calling by using the counterpart device can view the content data in an electronic mail receivable device of their choice, such as the mobile phone in hand or a personal computer.

Next, with reference to FIG. 8, the following further details the setting for selectively sharing the specific content data set out of the content data sets obtained by the content receiving section 6. FIG. 8 is an explanatory drawing describing a setting format for specifying the obtained content data set.

The content data set to be shared with the counterpart device in the video communication device 1 is determined according to four attributes, the device, protocol, port and data type. In response, the setting format for selecting the content data to be shared employs a format which partitions these attributes with the use of ":", illustrated as the setting format in FIG. 8. The attributes used for selecting the content data set to be shared and the setting format for specifying these attributes are just one example, and any communication devices which appropriately modify the attributes and the setting format are also included in the technical scope of the present invention.

FIG. 8 illustrates a plurality of examples each of which is indicative of setting for selecting the content data. Example 1 is a content data set received by an IrSimple mode via an infrared reception port 17 indicated as Ir. The example shows the setting for selectively sharing image data in extensions of jpg or png. Example 2 is a content data set received at an HTTP protocol from a port 8080 via the Ethernet I/F 11. The example shows the setting for selectively sharing image data in a JPG format. Example 3 shows the setting for sharing a JPG file inside the/share/directory in an SD memory card, when the SD memory card is inserted to the SD memory card reader 18. Example 4 shows the setting for selectively sharing a JPG data set received via the Bluetooth module. Finally, example 5 shows the setting for sharing an MPEG4 data stream received at a port 4000 via the Ethernet I/F 11.

The following describes the communication method according to the present invention with reference to FIGS. 9 through 17.

Figure 9:
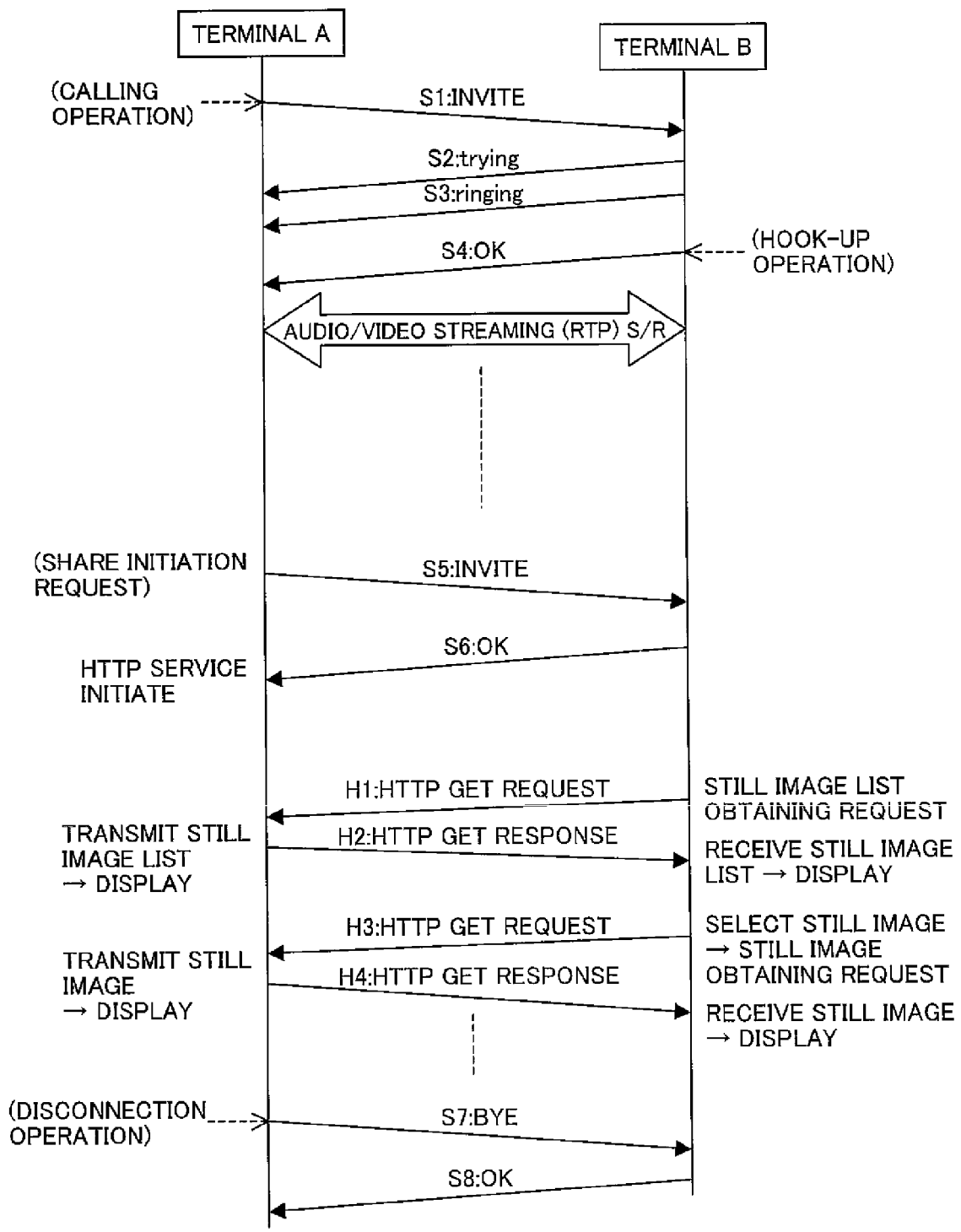
FIG. 9 is a communication sequence diagram illustrating a typical communication method carried out between two communication devices according to the present invention.

With reference to FIG. 9, the following first describes a typical communication method in a communication system made up of two video communications 1. FIG. 9 is a communication sequence diagram illustrating a typical communication carried out between two video communication devices 1 (referred as terminal A and terminal B in FIG. 9 and in the following description). The video communication device 1 performs signaling in accordance with the SIP as described above. The SIP is a protocol of an Internet standard, therefore a detailed description of the SIP message itself is omitted.

When the user instructs the terminal A to carry out transmission to the counterpart device by a remote control operation, the terminal A transmits a television telephone mode session establishment initiation request (S1: INVITE) to the terminal B specified as the counterpart device.

The terminal B which receives the S1: INVITE responds to the terminal A by transmitting an "S2: trying", to notify the terminal A that the session establishment request has been received. The terminal B notifies the user of the incoming call by ringing a ringtone, and transmits an "S3: ringing" to the terminal A, to notify that the ringtone has been rang. If the user of the terminal B pushes the connection key 23 on the remote control 1b, the hook-up operation is performed, and the terminal B transmits an "S4: OK response" to the terminal A, the device on the transmitting side. From the above sequence, the call session is established between the terminal A and terminal B. When the call session is established, the terminal A and the terminal B transmit video/audio inputted from the camera/microphone to each other. The terminals A and B also output the received video/audio from the display/speaker. This accomplishes the interactive television telephone call.

When the content receiving section 6 obtains the content data in the terminal A, the communication control section 2 transmits a share initiation request S5: INVITE to the terminal B.

With reference to FIG. 10, the following describes message content to be transmitted by the "S5: INVITE". FIG. 5 illustrates a specific example of a message transmitted in INVITE.

The message shown in FIG. 10 is described by the Internet standard SDP and includes a media description 100 for specifying the media to be used in the call session. The media description 100 includes an audio media description 101, a video media description 102, and a content media description 103. The audio media description 101 and the video media description 102 respectively specify the media to transmit and receive the audio data and video data for the call, and is the same as the media description included in the "S1: INVITE".

While, the content media description 103 is a description for newly adding a media to share the content data. The content media description 103, in the first line thereof, specifies the transmission and reception of TCP packets by the HTTP protocol by using the port 4070. Furthermore, the content media description 103 includes, in the second line thereof, an extension field for specifying an application of the counterpart device to receive the content data. This accordingly allows the generation of various shared applications.

The extension field of the content media description 103 illustrated in FIG. 10 specifies reception of the content data to be shared with an application called "sharpStillImageShare", by using an HTTP communication. The "sharpStillImageShare" is a name of an application which can obtain the aforementioned list files and content data by transmitting an HTTP GET request.

In the extension field, it is possible to additionally specify a parameter and is possible to further restrict the transmission and reception of the content data by the parameter. In the example illustrated in FIG. 10, the HTTP service notifies the terminal B that the HTTP service would accept requests for just 60 seconds, following a negotiation, by specifying the parameter 60.

With reference to FIG. 9, the following description continues on with the explanation related to the communication between the terminal A and the terminal B.

When the "S5: INVITE" is received, the terminal B analyses content thereof and determines whether to permit the addition of the media described in the content media description 103. If the terminal B permits addition of the media, the terminal B transmits the "S6: OK" to the terminal A. The terminal A which receives the "S6: OK" activates the HTTP server, and starts the HTTP service. In response to the above, the content share service starts by the "sharpStillImageShare" in terminal A, in addition to the television telephone communication by the interactive streaming of the video/audio.

On the other hand, the terminal B first obtains the content list from the terminal A, and then obtains the content data selected by the user from the content list, in accordance with the specification of the "sharpStillImageShare". More specifically, as illustrated in FIG. 9, the terminal B transmits a content list obtaining request (H1: HTTP GET request) to the terminal A, and the terminal B obtains the content list (H2: HTTP GET response) transmitted from the terminal A having received the request. Following the obtaining of the content list, the terminal B displays in the display a display image as like the one illustrated in FIG. 2(*b*), for the user to choose the desired content item from the content list. The user selects the desired content item by using the remote control 1*b*. The terminal B transmits a content-data-obtaining request including the name of the files which are selected by the user (H3: HTTP GET request), when the user selects the content item. The terminal A having received the request transmits the content data (H4: HTTP GET response) to the terminal B. The content data is thus received by the terminal B.

Note that, in consideration of security, the following arrangement is preferable. The communication control section 2 (communication device determination means) determines whether or not the communication device having responded to the share initiation request and the communication device having transmitted the HTTP GET request (content-data-obtaining request) are identical to each other. If the communication control section 2 determines that the communication device having responded to the share initiation request and the communication device having transmitted the HTTP GET request (content-data-obtaining request) are not identical to each other, the content transmission section 8 does not transmit the content data. The communication control section 2 (communication device determination means) carries out the determination by comparing an IP address included in the received HTTP GET request (content-data-obtaining request) with an IP address included in the SDP description in the "S6: OK (response)" or the "SIP response".

When the user carries out a disconnection operation with respect to the terminal A or the terminal B, e.g., pushing of the disconnection key 24 equipped on the remote control 1*b*, a session close request is transmitted from the terminal, with respect to which the disconnection operation have been carried out, to the counterpart device. In the communication sequence diagram illustrated in FIG. 9, the disconnection operation is carried out in the terminal A, and an "S7: Bye" is transmitted from the terminal A to the terminal B. The terminal B having received the "S7: Bye" transmits an "S8: OK" to the terminal A, and ends the call session. The terminal A having received the "S8: OK" also ends the call session and the HTTP service.

The communication output section 5 equipped on each of the terminal A and the terminal B displays the content list on the display 14 at the point (timing) where the "H2: HTTP GET response" is transmitted or received.

In the terminal A, the communication output section 5 (content data outputting means) preferably begins to output the content data to the display 14 at the same time the content transmission section 2 (content data transmission section) begins to transmit the content data to the terminal B. In addition, it is preferable that the terminal B begins to output the received content data to the display at the same time the terminal B begins to receive the data. More specifically, the communication output section 5 equipped in each of the terminal A and the terminal B displays a still image data on the display 14 at the point (timing) where the terminal A and the terminal B transmit or receive the "H4: HTTP GET response". That is, the communication output section 5 (content data output means) begins to output the content data to the display 14 at the same time the content transmission section 2 (content data transmission means) begins to transmit the content data. Therefore, the communication output section 5 of the terminal A and the communication output section 5 of the terminal B respectively display the shared content data on the display of the terminal A and the display of the terminal B in a synchronizing manner.

The arrangement for displaying the shared content data in a synchronized manner is not limited to the aforementioned arrangement. More specifically, for example, it may be so arranged that: the HTTP server of the terminal A and the HTTP server of the terminal B are activated, and a controlling command for controlling the display in the terminal A and a controlling command for controlling the display in the terminal B are transmitted/received by the HTTP as well as the content data to be shared. The display images of both terminals may be synchronized by this controlling commands, by controlling the timing of displaying the content data on the display, or a zoom, focus and the like.

Note that, the communication method according to the present invention is sufficient as long as the method allows the content data to be transmitted from the communication device having obtained the content data to another communication device which establishes connection with that communication device. Therefore, the communication method is not limited to the communication method which follows the communication sequence illustrated in FIG. 9. More specifically, other communication sequences as illustrated in FIG. 11 or FIG. 12 are also included in the technical scope of the claims.

FIG. 11 is a communication sequence diagram illustrating a communication method in which the content data is transmitted from the terminal A to the terminal B directly. In the communication method illustrated in FIG. 11, the terminal A immediately transmits the obtained content data to the terminal B by HTTP POST, following the reception of the "S6: OK". It is possible to share the content data in such communication method also by activating the HTTP server in the terminal B.

Figure 12:
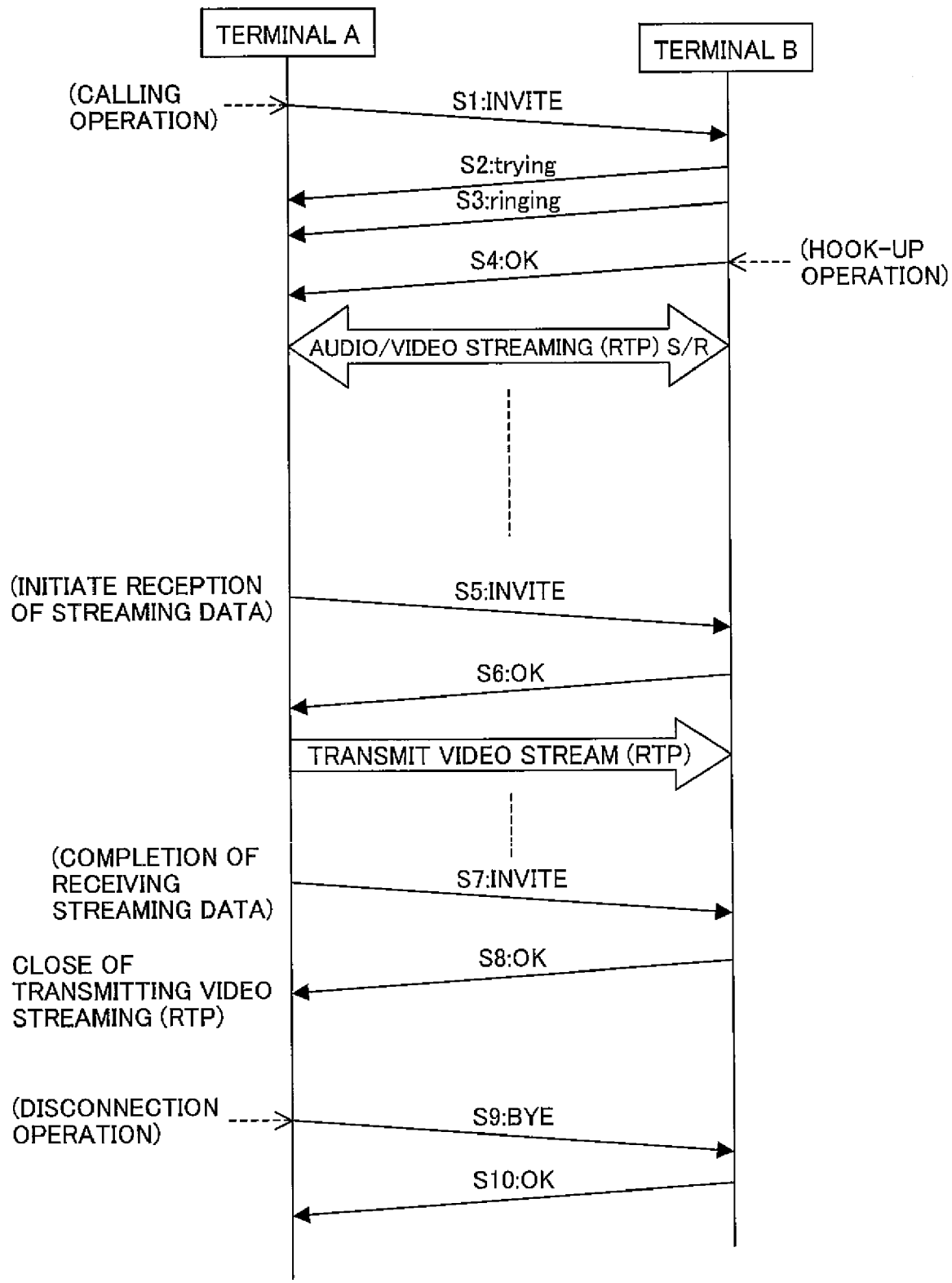
FIG. 12 is a communication sequence diagram illustrating another communication method carried out between two communication devices according to the present invention.

FIG. 12 is a communication sequence diagram illustrating a communication method in which streaming transmission of the content data from the terminal A to the terminal B is carried out. The media for the streaming transmission is specified in the "S5: INVITE" in the communication method illustrated in FIG. 12. The terminal A starts the streaming transmission of the obtained content data following the reception of the "S6: OK". The streaming transmission from the terminal A may be carried out by transmitting a streaming packet externally obtained by the terminal A as it is to the terminal B. The streaming transmission from the terminal A may be carried out by transcoding the streaming packets obtained by the terminal A into a codec suitable for the terminal B, then transmitted to the terminal B. FIG. 13 illustrates an INVITE message which specifies the media for the streaming transmission. In this example, the SDP is interpreted as an application media, however of course this may be described by the video media.

The content transmission section 8 (content data transmission means) preferably initiates streaming transmission of the content data at the point where the content receiving section 6 (content data obtaining means) comes to obtain the streaming data.

Figure 14:
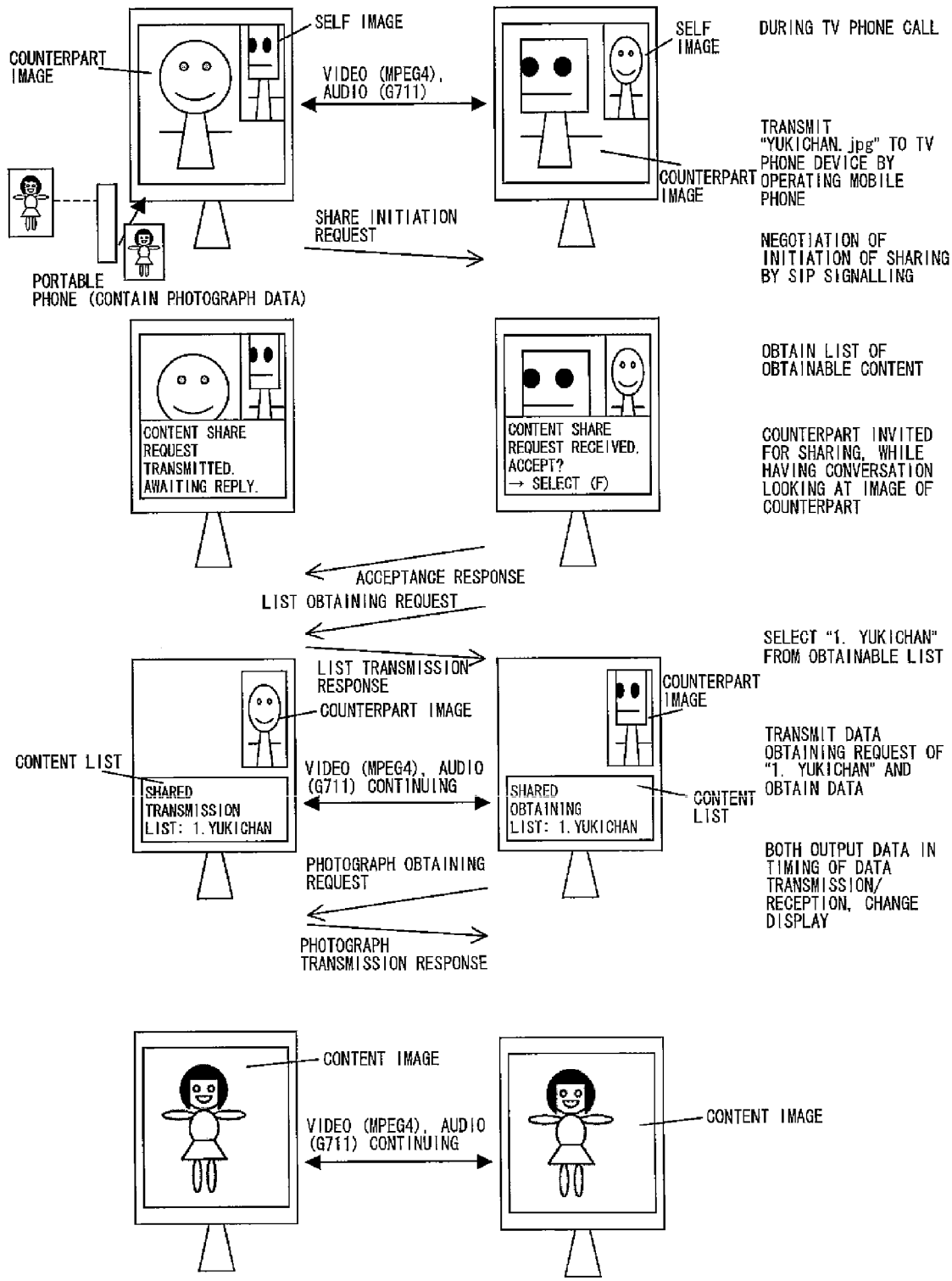
FIG. 14 is an explanatory drawing describing a content sharing method and illustrates transition of a display image outputted to a user by the communication device according to the present invention.

With reference to FIG. 14, the following describes the content sharing method illustrated in FIG. 9 in a user's viewpoint, on the basis of the display image displayed on each of the terminal A and the terminal B. FIG. 14 is an explanatory drawing illustrating transition of a display image outputted to the user by the video communication device 1.

The first stage of FIG. 14 illustrates two video communication devices 1 in calling state. As illustrated in the first stage of FIG. 14, the display image displayed on the video communication device 1 includes an image of the counterpart captured by the counterpart device and a self-image of oneself captured by the video communication device 1. The user can carry on with the audio call while visually viewing the images. Furthermore, the user using the video communication device 1 on the left side (terminal A) possesses the portable phone, which is an external device. The user of the terminal A attempts to share digital photographic data (JPEG data) saved in the mobile phone with the counterpart device illustrated on the right side (terminal B). The digital photographic data is one of which a girl is photographed and has a file name of "Yukichan.jpg".

The second stage in FIG. 14 illustrates the state after the user calling by using the terminal A transmits the digital photographic data to the terminal A by the infrared communication from the mobile phone. The terminal A obtains the digital photograph data transmitted from the mobile phone via the infrared reception port 17 and transmits the share initiation request to the terminal B. A message "Content share request transmit. Awaiting reply." is displayed on the display image of the terminal A as illustrated in the second stage of FIG. 14, indicating that the share initiation request (S5: INVITE) has been transmitted to the counterpart device. On the other hand, a message of "Content share request received. Accept?" is displayed on the display image of the terminal B.

If the user on the reception side selects to initiate share of content, an acceptance response (S6: OK) is transmitted from the terminal B to the terminal A. The terminal A and the terminal B share the content list by transmitting and receiving the list obtaining request (H1: HTTP GET request) and the list transmission response (H2: HTTP GET response), respectively. The third stage in FIG. 14 illustrates the display image displayed on each terminal after the content list is shared. The terminal A and the terminal B display the name of the file included in the content list on the display image, in accordance with the shared content list. In the example, the extension is omitted from "Yukichan.jpg" when displaying the list on the display image, thereby displaying "Yukichan" on the display image.

If the user in the reception side instructs the terminal B to share the content data indicated by "Yukichan", the terminal B transmits a photograph obtaining request (H3: HTTP GET request) to the terminal A, and receives the content data "Yukichan.jpg" as a response (H4: HTTP GET response) towards the request. As shown in the fourth stage of FIG. 14, the terminal A/terminal B outputs the "Yukichan.jpg" content data to the display at the point at which the content data "Yukichan.jpg" is transmitted/received. As such, the user can have a conversation while looking at the same photograph during the call, by displaying the content data in a synchronized manner in both the terminal A and the terminal B. The operations required by the user in order to perform this are only (i) the data transmission operation on the mobile phone and (ii) the operation carried out with respect to the video communication device 1 so as to determine whether or not to permit the share.

Figure 15:
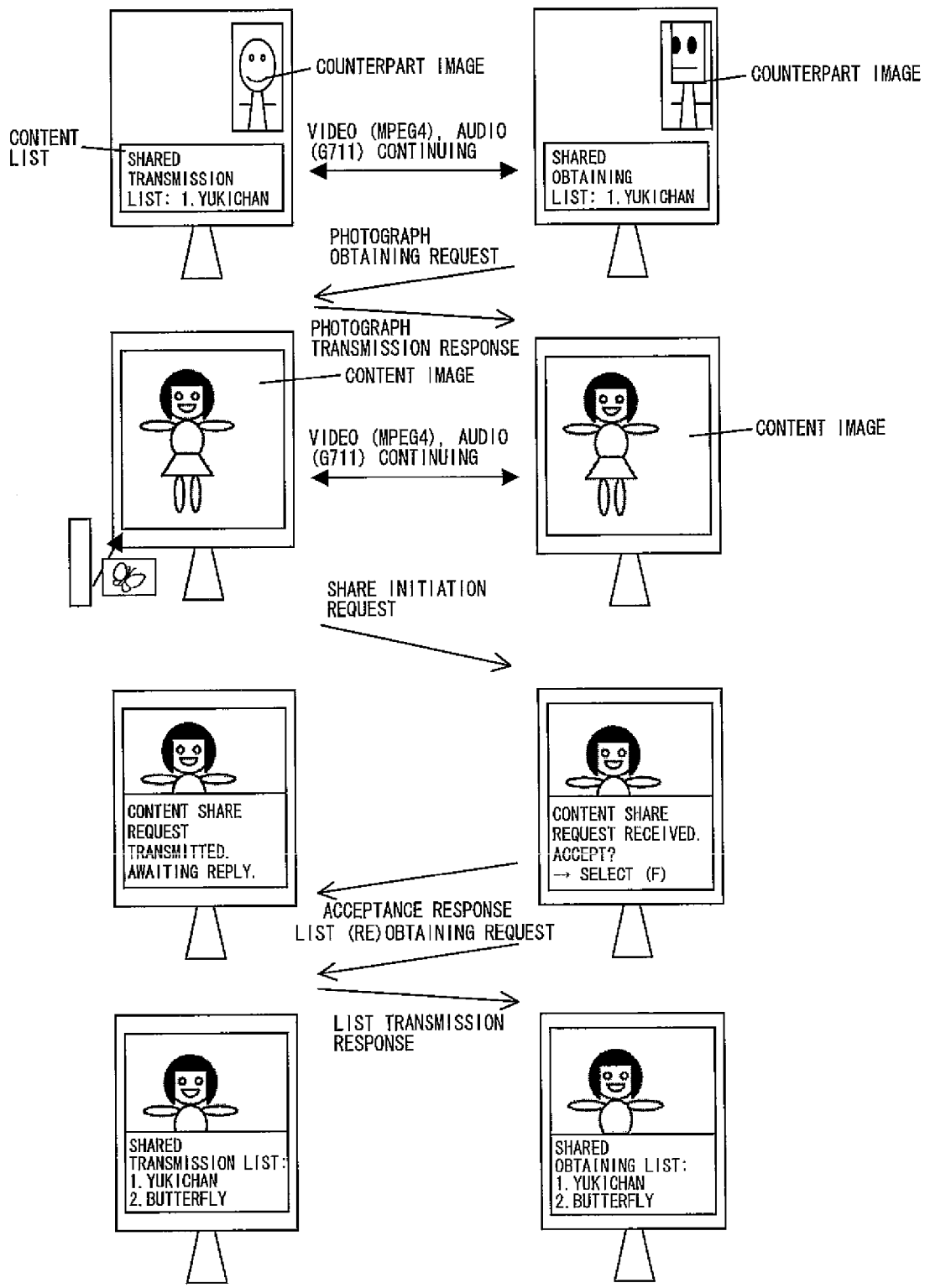
FIG. 15 is another explanatory drawing describing a contents sharing method and illustrates transition of a display image outputted to a user by the communication device according to the present invention.

The video communication device 1 can repeatedly receive external content data, and share the plurality of content data sets with the counterpart device. FIG. 15 is an explanatory drawing describing the content sharing method when another digital photographic data "butterfly.jpg" is obtained by the terminal A from the mobile phone, following the content sharing process illustrated in FIG. 14. FIG. 15 illustrates the transition of the display image in this case.

As illustrated in FIG. 5, once the share of a first content data is completed in the process A9, the video communication device 1 returns to a standby state for obtaining content data (process A1). If second content data is obtained, the content receiving section 6 stores and retains the second content data in the flash memory 19. The content storage section 7 generates a content list including the file names of all content data sets stored in the flash memory 19. Therefore, the content list includes the file name of the first content data having been obtained first and the file name of the second content data having been obtained later.

If specifically described with reference to FIG. 15, the content list would include the two file names, "Yukichan.jpg" and "butterfly.jpg", at the point where the second content data "butterfly.jpg" is obtained. The display image in accordance with the content list is illustrated in the fourth stage of FIG. 15. This allows the user to thus select the content items by viewing the display image and share the desired content items.

Figure 16:
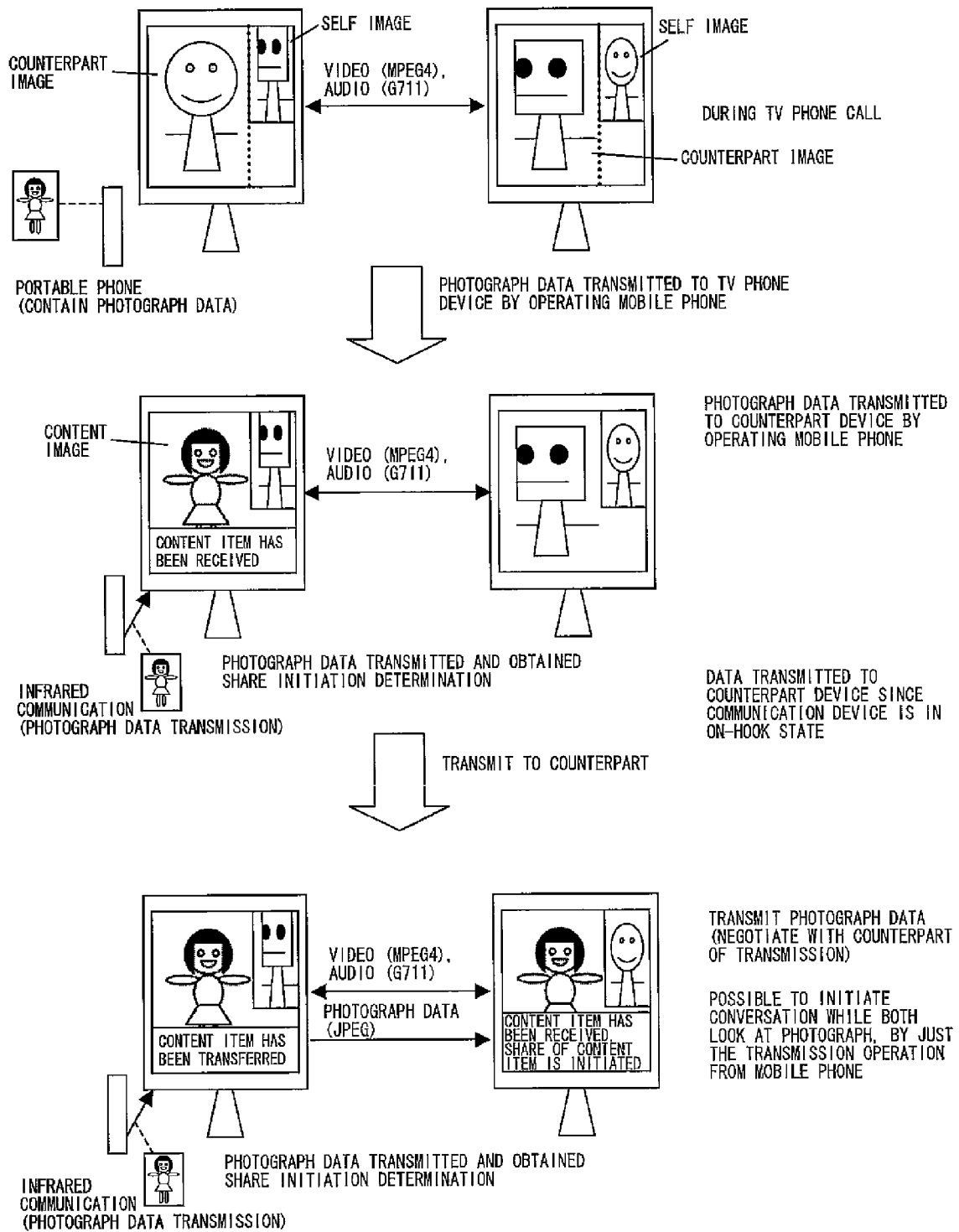
FIG. 16 is another explanatory drawing describing a contents sharing method and illustrates transition of a display image outputted to a user by the communication device according to the present invention.

With reference to FIG. 16, the following describes an alternative example of the aforementioned content sharing method. FIG. 16 is an explanatory drawing illustrating transition of a display image outputted to a user by the video communication device 1.

The difference in the content sharing method illustrated in FIG. 16 to the aforementioned sharing method is that the photographic data (content data) obtained by the terminal A from the external device (mobile phone) is immediately transmitted to the terminal B, without the transmission or reception of the content list. In order to carry out such content sharing, the share initiation request (S5: INVITE) is to be modified as in FIG. 17. In the share initiation request illustrated in FIG. 17, the file name of the content data to be shared (image.jpg) is specified as a parameter, in the extension field of the content media description 103. The terminal B having received the share initiation request thus transmits the HTTP GET for receiving the content data. This enables the content data to be immediately obtained.

The present embodiment describes the communication method for carrying out communication between two communication devices (video communication device 1), however the present invention is not limited to this. That is, the present invention is applicable to a communication system with three or more communication devices, or, a communication method between three or more communication devices.

Figure 18:
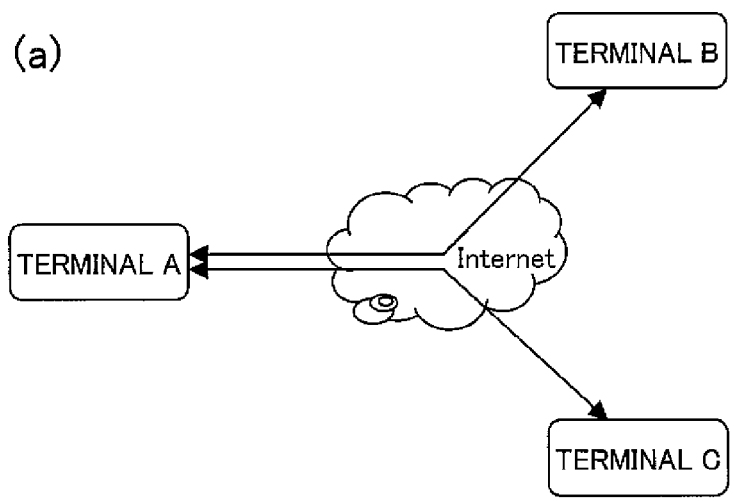
FIG. 18(a) is an explanatory drawing illustrating a mode of a tripartite communication of the communication device according to the present invention.
FIG. 18(b) is an explanatory drawing describing transition of a display image when selecting, in the communication device according to the present invention, a communication counterpart device which is permitted to share content data.
FIG. 18(c) is an explanatory drawing illustrating one mode of sharing content in a tripartite communication of the communication device according to the present invention.
Figure 18:
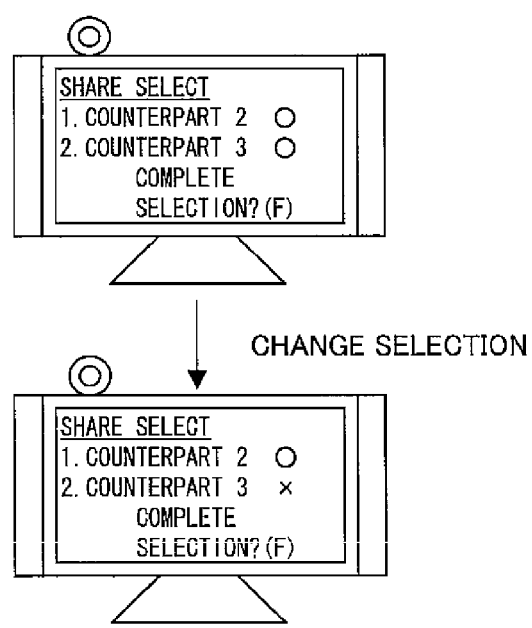
Figure 18:
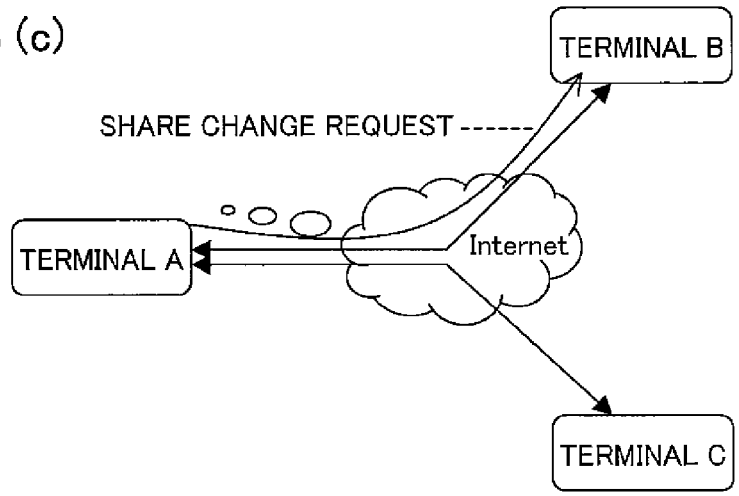

FIGS. 18(*a*) through 18(*c*) are explanatory drawings each of which describes a mode of communication between three video communication devices (terminals A through C). A tripartite call is carried out by the terminal A mediating the call between the terminal B and the terminal C. The terminal A establishes the call session in the same method as the aforementioned bilateral call, with each of the terminal B and the terminal C. This accordingly establishes the call session between the terminal B and the terminal C via the terminal A. In a regular call, the terminal A transmits to the terminal B (i) a video/audio signal received from the terminal C and (i) the video/audio signal, inputted to the terminal A itself with the two video/audio signals mixed together. This accomplishes the tripartite call.

The content sharing in the tripartite call is attained by the following method: the video communication device having obtained the content data specifies the video communication device with which the content data is to be shared, and the content data is transmitted to the specified video communication device. The transmission method of the content data to the specified video communication device may be the same as in the bilateral call.

The video communication device with which the content data is to be shared can be specified, for example, by the communication output section 5 and the remote control 1*b*. The communication output section 5 displays on the display section 14 a list of a plurality of counterpart devices which establish the call session. The remote control 1*b* is used by the user for selecting the counterpart device to share the content data from the displayed list of counterpart devices.

The content transmission section 8 requires to just transmit the share initiation request to the counterpart device selected by the user from the list of the counterpart devices displayed on the display, that is, the counterpart device specified by the sharable device specifying means. FIG. 18(*b*) illustrates a display image outputted by the communication output section 5. In the display image illustrated on the top stage of FIG. 18(*b*), the share of the content data is permitted for all counterpart devices which establish the call session, as the initial state. The user can indirectly select the counterpart permitted to share the content, by specifying out of all of the counterpart devices the counterpart device which the user does not permit the share. An example of a display image is illustrated in the lower stage of FIG. 18(*b*), where the user specifies the terminal C as the counterpart device not permitted to share the content, that is, where the user specifies the terminal B as the counterpart device permitted to share the content.

FIG. 18(*c*) is an explanatory drawing illustrating the mode of the content sharing when the terminal A obtains the content data, and the terminal B is selected as the sharing counterpart by the terminal A, as in the aforementioned. Even between four or more video communication devices, the similar share of the content data is accomplished.

Particularly, if the call is carried out between three or more video communication devices, the content data may be transmitted to the counterpart devices specified beforehand. This may be accomplished, for example, by storing the list of the counterpart devices permitted to share the content data (sharable communication device list) in the storage means such as the flash memory 19, and setting the content transmission section 8 so that the content data is transmitted to just the communication devices included in the list. FIG. 19 illustrates one example of the sharable communication device list.

FIG. 20 is a flow chart illustrating the content share initiation process before the content sharing is initiated when the communication control section 2 determines whether the counterpart device attempting to share the content data is the counterpart device permitted in sharing the content data. In the flow chart, a process A14 and a process A15 each of which determines whether the former is included in the latter or not are added. In the processes, the communication control section 2 compares the counterpart devices attempting to share the content data with the counterpart device specified by the sharable device specifying means.

Note that, in the present embodiment, the present invention is applied to the video communication device, which is a terminal device of a television conference system. However, the present invention is not limited to this. That is, the present invention is applicable to communication devices such as the IP telephone and the television telephone which make a call by establishing a call session with other communication devices, and furthermore to communication devices which carry out communication by establishing a communication connection with other communication devices.

The embodiments and concrete examples of implementation discussed in the foregoing detailed explanation serve solely to illustrate the technical details of the present invention, which should not be narrowly interpreted within the limits of such embodiments and concrete examples. The scope of the present invention is as indicated in the scope of the claims, and all such modifications as would be obvious to one skilled in the art are intended to be included within the scope of the following claims.

That is, the present invention is not limited to the description of the embodiments above, but may be altered within the scope of the claims. An embodiment based on a proper combination of technical means disclosed in different embodiments is encompassed in the technical scope of the present invention.

As described above, a communication device according to the present invention comprises at least: communication connection establishing means for establishing communication connection with other communication device; content data obtaining means for obtaining content data from the outside; and content data transmission means for specifying another communication device as a communication device, to which the obtained content data should be transmitted, if connection with said another communication device is established when the content data obtaining means obtains the content data.

Further, as described above, a communication method according to the present invention comprises: a communication connection establishing step in which communication connection with other communication device is established; a content data obtaining step in which content data is obtained from the outside; and a transmission destination specifying step in which another communication device is specified as a communication device, to which the obtained content data should be transmitted, if connection with said another communication device is established when the content data is obtained in the content data obtaining step.

Further, as described above, a communication system according to the present invention comprises: a communication device (transmitting device); and other communication device (receiving device) which establishes connection with the communication device so as to receive content data transmitted from the communication device, wherein the communication device comprises: communication connection establishing means for establishing communication connection with other communication device; content data obtaining means for obtaining content data from the outside; and content data transmission means for specifying another communication device as a communication device, to which the obtained content data should be transmitted, if connection with said another communication device is established when the content data obtaining means obtains the content data.

Thus, in the communication device, the communication method, and the communication system according to the present invention, the user can specify another communication device, with which the communication device establishes communication connection, as a transmission destination of content data, merely by causing the communication device to obtain the content data from the outside without carrying out any other operation with respect to the communication device. That is, according to the arrangement, it is possible to easily share content data with the communication counterpart device with less operations.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention is applicable to a communication device which establishes communication connection so as to communicate with other communication device. Particularly, the present invention is applicable to a communication device which establishes a call session so as to call a counterpart device, e.g., a television conference system terminal device, a television telephone, an IP phone, and the like.

The invention claimed is:

1. A communication device, comprising:
call session establishing means for establishing call session with other communication device;
content data obtaining means for obtaining content data from the outside; and
content data transmission means for specifying another communication device as a communication device, to which the obtained content data should be transmitted, if call session with said another communication device is established when the content data obtaining means obtains the content data,
wherein, if call session with said another communication device is not established at a time when the content data obtaining means obtains the content data, the call session establishing means establishes call session with a predetermined communication device having been preset in advance.

2. The communication device as set forth in claim 1, further comprising:
transmission initiation request transmission means for transmitting, to said another communication device, a transmission initiation request for requesting initiation of transmission of the content data; and
response receiving means for receiving a response to the transmission initiation request which response is transmitted from said another communication device upon receiving the transmission initiation request, wherein
the content data transmission means transmits the content data to said another communication device when the response received by the response receiving means is indicative of acceptance of the transmission initiation request.

3. The communication device as set forth in claim 2, further comprising content-data-obtaining-request receiving means for receiving a content-data-obtaining request which is transmitted from said another communication device having received the transmission initiation request and which requests the content data to be obtained, wherein
when the content-data-obtaining-request receiving means receives the content-data-obtaining request, the content data transmission means transmits the content data to said another communication device.

4. The communication device as set forth in claim 3, further comprising communication device determination means for determining whether or not the communication device having transmitted the response and the communication device having transmitted the content-data-obtaining request are identical to each other, wherein
when the communication device determination means determines that the communication device having transmitted the response and the communication device having transmitted the content-data-obtaining request are not identical to each other, the content data transmission means does not transmit the content data.

5. The communication device as set forth in claim 3, wherein:
the transmission initiation request includes time specifying information for specifying a time for the content-data-obtaining-request receiving means to receive the content-data-obtaining request, and
the content-data-obtaining-request receiving means does not receive the request at a time other than the specified time.

6. The communication device as set forth in claim 1, further comprising:
transmission initiation request transmission means for transmitting, to said another communication device, a transmission initiation request for requesting initiation of transmission of the content data; and
response receiving means for receiving a response to the transmission initiation request which response is transmitted from said another communication device upon receiving the transmission initiation request, wherein
when the response received by the response receiving means requests transmission of the content data to a specific communication device, the content data transmission means regards the specific communication device as a communication device to which the obtained content data should be transmitted.

7. The communication device as set forth in claim 1, wherein when the content data obtaining means receives the content data via a specific interface having been preset in advance, the content data transmission means transmits the content data to said another communication device.

8. The communication device as set forth in claim 1, further comprising content data determination means for determining whether or not a type of the content data obtained by the content data obtaining means is identical to a specific type having been preset in advance, wherein
when the content data determination means determines that the type of the content data is identical to the specific type having been preset in advance, the content data transmission means transmits the content data to said another communication device.

9. The communication device as set forth in claim 1, further comprising content data output means for outputting the content data obtained by the content data obtaining means to a display which allows the communication device to transmit a display signal thereto, wherein
the content data output means begins to transmit the content data and begins to output the content data to the display at the same time.

10. The communication device as set forth in claim 1, wherein:
the content data is streaming data, and
the content data transmission means begins streaming transmission of the content data from a time when the content data obtaining means begins to obtain the content data.

11. The communication device as set forth in claim 1, wherein the content data transmission means specifies, as a communication counterpart device to which the obtained content data should be transmitted, only a specific communication device out of plural other communication devices with which the call session establishing means establishes call session.

12. The communication device as set forth in claim 11, wherein the specific communication device is, out of the plural other communication devices with which the call session establishing means establishes call session, a communication device included in a sharable communication device list in which communication devices allowed to share content data of the communication device are listed.

13. The communication device as set forth in claim 11, further comprising:
display means for displaying, in the display which allows the communication device to transmit a display signal thereto, a list of the plural other communication devices with which the call session establishing means establishes call session; and
communication device selection means for allowing a user to select at least one communication device from the plural other communication devices displayed in the display, wherein
the specific communication device is said at least one communication device selected by the user with the communication device selection means.

14. The communication device as set forth in claim 1, further comprising electronic mail transmission means for generating an electronic mail including the content data obtained by the content data obtaining means so as to transmit the electronic mail to an electronic mail address, wherein
when the content data transmission means fails to transmit the content data, the electronic mail transmission means transmits the electronic mail to the electronic mail address which has been beforehand associated with each of the plural other communication devices with which the call session establishing means establishes call session.

15. The communication device as set forth in claim 1, further comprising:
content data storage means for storing therein content data sets obtained by the content data obtaining means so as to generate a content data list in which the stored content data sets are listed;
content data list transmission means for transmitting the content data list to said another communication device; and
content-data-obtaining-request receiving means for receiving a content-data-obtaining request for obtaining at least one content data set included in the content data list which request is transmitted from said another communication device having received the content data list, wherein
the content data transmission means transmits said at least one content data set, which has been requested to be obtained, to said another communication device having received the content data list.

16. A communication system, comprising:
the communication device as set forth in claim 1; and
another communication device which call session with said communication device.

17. A non-transitory computer-readable storage medium, storing therein a program for causing a computer to function as the means of the communication device as set forth in claim 1.

18. The communication device as set forth in claim 1, wherein:
the content data obtaining means obtains the content data via a communication section for receiving content data transmitted by an external device, and
the content data transmission means specifies another communication device as a communication device, to which the obtained content data should be transmitted, if call session with said another communication device is established when the content data obtaining means obtains the content data via the communication section.

19. A communication method, comprising:
a first call session establishing step in which call session with other communication device is established;
a content data obtaining step in which content data is obtained from the outside;
a transmission destination specifying step in which another communication device is specified as a communication device, to which the obtained content data should be transmitted, if call session with said another communication device is established when the content data is obtained in the content data obtaining step; and
a second call session establishing step in which call session with a predetermined communication device is established, if the call session with the another communication is not established when the content data is obtained in the content data obtaining step.

* * * * *